(12) United States Patent
Roine et al.

(10) Patent No.: US 10,595,008 B2
(45) Date of Patent: Mar. 17, 2020

(54) VIDEO IMAGING AN AREA OF INTEREST USING NETWORKED CAMERAS

(71) Applicant: Oy Vulcan Vision Corporation, Hesinki (FI)

(72) Inventors: Asko Roine, Espoo (FI); Hannu Eronen, Vantaa (FI); Pekka Roine, Ascona (CH)

(73) Assignee: Oy Vulcan Vision Corporation, Helsinki (FI)

( * ) Notice: Subject to any disclaimer, the term of this patent is extended or adjusted under 35 U.S.C. 154(b) by 0 days.

(21) Appl. No.: 15/773,123

(22) PCT Filed: Oct. 31, 2016

(86) PCT No.: PCT/US2016/059783
§ 371 (c)(1),
(2) Date: May 2, 2018

(87) PCT Pub. No.: WO2017/075614
PCT Pub. Date: May 4, 2017

(65) Prior Publication Data
US 2018/0324410 A1  Nov. 8, 2018

Related U.S. Application Data

(60) Provisional application No. 62/248,066, filed on Oct. 29, 2015, provisional application No. 62/345,696, (Continued)

(51) Int. Cl.
*H04N 13/296* (2018.01)
*H04N 13/189* (2018.01)
(Continued)

(52) U.S. Cl.
CPC ......... *H04N 13/296* (2018.05); *G06T 3/4038* (2013.01); *H04N 5/23238* (2013.01);
(Continued)

(58) Field of Classification Search
CPC ......... H04N 21/4307; H04N 21/21805; H04N 21/8547; H04N 7/18; H04N 5/247;
(Continued)

(56) References Cited

U.S. PATENT DOCUMENTS 5,495,576 A  2/1996 Ritchey
5,745,126 A  4/1998 Jain
(Continued)

FOREIGN PATENT DOCUMENTS

CN  102323854  1/2012
WO  2014114754  7/2014
WO  2015142174  9/2015

OTHER PUBLICATIONS

International Application No. PCT/US2016/059783, International Search Report and Written Opinion dated Jan. 19, 2017.
(Continued)

*Primary Examiner* — Hung Q Dang
(74) *Attorney, Agent, or Firm* — Ahmann Kloke LLP

(57) ABSTRACT

The systems, methods, and/or computer-readable media described herein allow a reviewer to review video content of multiple perspectives of area(s) of interest at a specific time using a system of networked and time-synchronized video cameras. The networked and time-synchronized video cameras may comprise dedicated video cameras or may be coupled to mobile phones or tablet computing devices, and/or those incorporated in action housings. The networked and time-synchronized video cameras may capture multiple perspectives of area(s) of interest in that they may be arranged so that their fields of view are directed toward different orientations with respect to the area(s) of interest.

19 Claims, 24 Drawing Sheets

Related U.S. Application Data filed on Jun. 3, 2016, provisional application No. 62/381,261, filed on Aug. 30, 2016.

(51) Int. Cl.
  *H04N 13/271* (2018.01)
  *H04N 13/243* (2018.01)
  *G06T 3/40* (2006.01)
  *H04N 5/232* (2006.01)
  *H04N 5/247* (2006.01)

(52) U.S. Cl.
  CPC ......... *H04N 13/189* (2018.05); *H04N 13/243* (2018.05); *H04N 13/271* (2018.05)

(58) Field of Classification Search
  CPC ...... H04N 7/181; H04N 5/265; H04N 5/2624; H04N 5/23238; H04N 7/147; H04N 5/77; H04N 21/234318; H04N 19/597; H04N 21/242; H04N 5/23203; H04N 5/45; H04N 21/8586; G11B 27/10; G03B 37/00; G03B 15/00; G03B 37/04; G08B 13/19641; A61B 5/1128; Y10S 707/99954; G06T 2207/10021
  See application file for complete search history.

(56) References Cited

U.S. PATENT DOCUMENTS

| | | | |
|---|---|---|---|
| 5,850,352 A | 12/1998 | Moezzi | |
| 6,052,539 A | 4/2000 | Latorre | |
| 6,522,325 B1 | 2/2003 | Sorokin | |
| 6,535,226 B1 | 3/2003 | Sorokin | |
| 6,624,853 B1 | 9/2003 | Latypov | |
| 6,990,681 B2 | 1/2006 | Wang | |
| 7,084,904 B2 | 8/2006 | Liu | |
| 7,264,554 B2 | 9/2007 | Bentley | |
| 7,286,143 B2 | 10/2007 | Kang | |
| 7,292,257 B2 | 11/2007 | Kang | |
| 7,613,999 B2 | 11/2009 | Sorokin | |
| 7,646,404 B2 | 1/2010 | Liu | |
| 7,693,702 B1 | 4/2010 | Kerner | |
| 7,843,497 B2 | 11/2010 | Conley | |
| 7,876,353 B2 | 1/2011 | Piccionelli | |
| 8,013,899 B2 | 9/2011 | Gillard | |
| 8,427,545 B2 | 4/2013 | Porter | |
| 8,432,463 B2 | 4/2013 | Conley | |
| 8,520,054 B2 | 8/2013 | Cox | |
| 9,573,062 B1 | 2/2017 | Long | |
| 2005/0278618 A1 | 12/2005 | Ogikubo | |
| 2006/0159307 A1 | 7/2006 | Anderson | |
| 2010/0295945 A1 | 11/2010 | Plemons | |
| 2010/0299630 A1 | 11/2010 | McCutchen | |
| 2011/0025853 A1 | 2/2011 | Richardson | |
| 2011/0254927 A1 | 10/2011 | Yahata | |
| 2012/0200665 A1 | 8/2012 | Furumura | |
| 2013/0163817 A1 | 6/2013 | Porter | |
| 2013/0235225 A1 | 9/2013 | Conley | |
| 2014/0005484 A1 | 1/2014 | Charles | |
| 2014/0132788 A1 | 5/2014 | Ramsay | |
| 2014/0267748 A1 | 9/2014 | Lee | |
| 2015/0249815 A1 | 9/2015 | Sandrew | |
| 2015/0317822 A1 | 11/2015 | Haimovitch-Yogev | |
| 2015/0365632 A1 | 12/2015 | Eilertsen | |
| 2016/0127690 A1 | 5/2016 | Kaehler | |
| 2017/0070674 A1* | 3/2017 | Thurow | ................ H04N 7/181 |
| 2017/0155888 A1 | 6/2017 | Prechtl | |
| 2017/0244956 A1* | 8/2017 | Stiglic | ................ H04N 13/156 |

OTHER PUBLICATIONS

Aylward, Ryan R, "Sensemble: A Wireless Inertial Sensor for Interactive Dance and Collective Motion Analysis," Masters Thesis, Massachusetts Institute of Technology, pp. 3, 21-30, 67-97, Sep. 2006.

Ghasemzadeh, Hassan et al., "Coordination Analysis of Human Movements with Body Sensor Networks: A Signal Processing Model to Evaluate Baseball Swings," IEEE Sensors Journal, vol. 11, No. 3, pp. 603-610, Mar. 2011.

Hsu, Yu-Liang et al., "A Wearable Inertial-Sensing-Based Body Sensor Network for Shoulder Range of Motion Assessment," 2013 International Conference on Orange Technologies (ICOT), pp. 328-331, Mar. 2013.

Karliga, Ibrahim et al., "Analyzing Human Body 3-D Motion of Golf Swing from Single-Camera Video Sequences," 2006 IEEE International Conference on Acoustics, Speech and Signal Processing (ICASSP), vol. 5, May 2006.

Tao, Weijun et al., "Gait Analysis Using Wearable Sensors," Sensors, vol. 12, No. 2, pp. 2255-2283, Feb. 16, 2012.

Wahab, Yufridin et al., "Gait Analysis Measurement for Sport Application Based on Ultrasonic System," 2011 IEEE 15th International Symposium on Consumer Electronics (ISCE), pp. 20-24, Jun. 2011.

European Patent Application No. 16861060.8, Search Report dated May 24, 2019.

\* cited by examiner

VIDEO IMAGING AN AREA OF INTEREST USING NETWORKED CAMERAS

CROSS-REFERENCE TO RELATED APPLICATIONS

This application is a national stage application pursuant to 35 U.S.C. § 371 of International Application No. PCT/US2016/059783 filed Oct. 31, 2016, which claims priority to U.S. Provisional Patent Application Ser. No. 62/248,066 filed Oct. 29, 2015, U.S. Provisional Patent Application Ser. No. 62/345,696 filed Jun. 3, 2016, and U.S. Provisional Patent Application Ser. No. 62/381,261 filed Aug. 30, 2016, the disclosures of which are hereby incorporated by reference herein.

BACKGROUND

Cameras have formed a part of coaching and other review tools. As an example, video cameras have been used to capture video content of sports, dance routines, and other activities. People may use the video content to review, either alone or with a coach, teacher, or other professional, their situational approaches, tactics, techniques, etc. As another example, police and/or security personnel may use video cameras to capture and review video content captured from security cameras and/or during investigations.

It may be desirable for a reviewer to view multiple perspectives of a specific area at a specific time. A coach or dance teacher, for instance, may find it useful to view multiple angles of a specific action or routine taken by a player or a student. A police officer or security personnel may find it useful to view a suspect from multiple angles at a specific time to assess the suspect's credibility, demeanor, etc. In many instances, however, video cameras may be limited to capturing only the items within their field of view, and therefore, only one perspective. It may be desirable to technically simplify capture of multiple perspectives of an area of interest at a specific time without implementing complicated processing steps after video capture or requiring a reviewer to watch in parallel multiple video feeds of an area of interest.

SUMMARY

The systems, methods, and/or computer-readable media described herein allow a reviewer to review video content of multiple perspectives of area(s) of interest at a time using a system of networked and time-synchronized video cameras. The networked and time-synchronized video cameras may comprise dedicated video cameras or may be coupled to mobile phones or tablet computing devices, and/or those incorporated in action housings. The networked and time-synchronized video cameras may capture multiple perspectives of area(s) of interest in that they may be arranged so that their fields of view are directed toward different orientations with respect to the area(s) of interest.

The networked and time-synchronized video cameras may be time-synchronized in that they begin capturing video content related to the area(s) of interest at approximately the same time. The video content from the networked and time-synchronized video cameras may be used to form a three-dimensional dome representation of the area(s) of interest, which, as described further herein, may allow a reviewer to view video content of any of the perspectives of the area(s) of interest at a specific time. The three-dimensional dome representation of the area(s) of interest may also include one or more orientation markers, which, as described further herein, may allow a reviewer to switch between perspectives of the area(s) of interest at a specific time. A playback device associated with the reviewer may be configured to display a stitched video representation of the area(s) of interest that is based on the three-dimensional dome representation. The stitched video representation may include one or more perspective user interface (UI) elements corresponding to the orientation markers that allow the reviewer to switch between video perspectives of the area(s) of interest at a specific time using the graphical interface of the playback device.

These and other advantages will become apparent to those skilled in the relevant art upon a reading of the following descriptions and a study of the several examples of the drawings.

DETAILED DESCRIPTION

Examples of Time-Synchronized Video Capture Environments

Figure 1A:
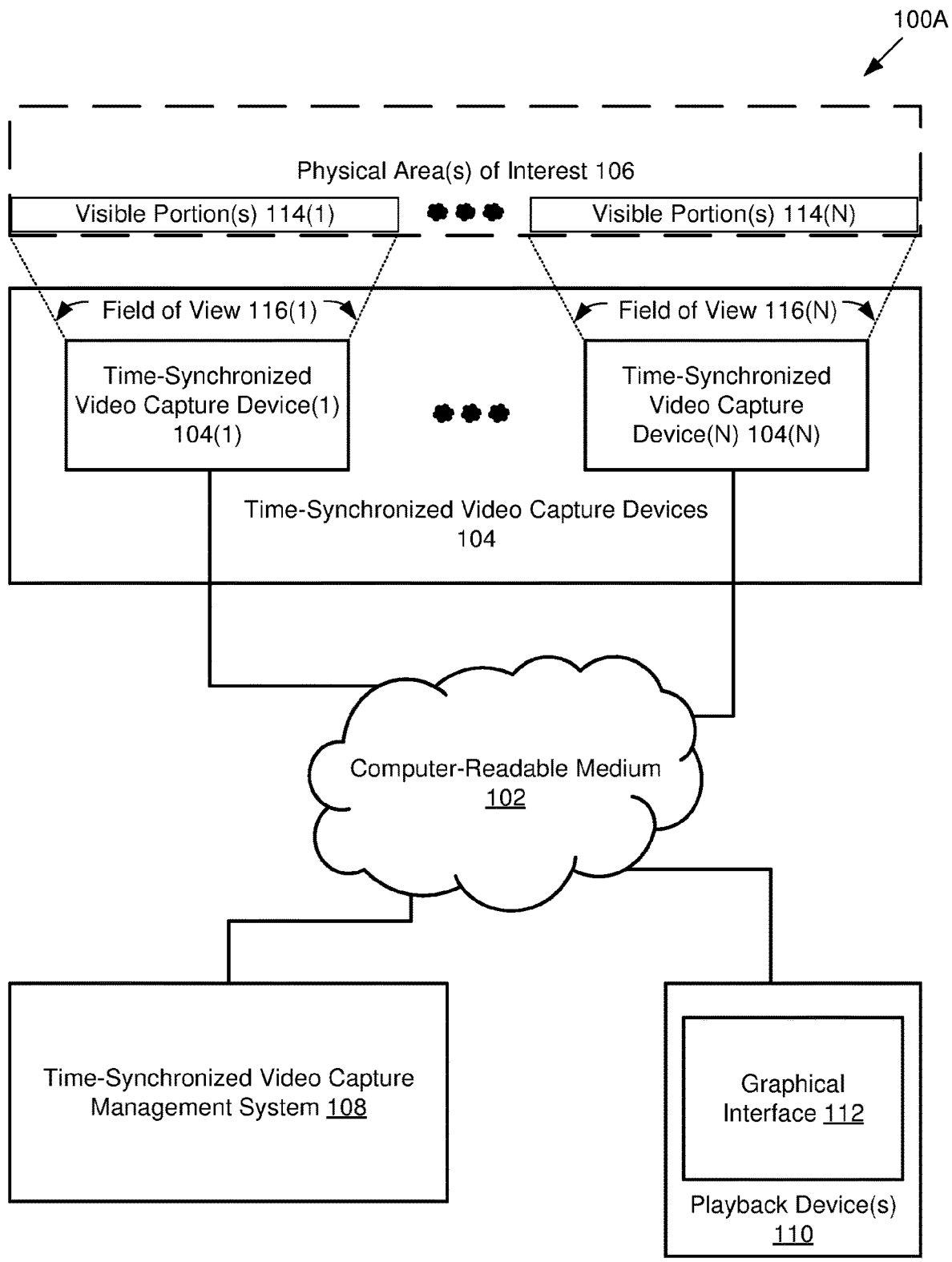
FIG. 1A depicts a diagram of an example of a time-synchronized video capture environment.

FIG. 1A depicts a diagram 100A of an example of a time-synchronized video capture environment. The diagram 100A includes a computer-readable medium 102, time-synchronized video capture devices 104, physical areas(s) of interest 106, a time-synchronized video capture management system 108, and playback device(s) 110. In the diagram 100A, the computer-readable medium 102 is coupled to the time-synchronized video capture devices 104, the time-synchronized video capture management system 108, and the playback device(s) 110.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or local area network (LAN). The computer-readable medium 102 can also encompass a relevant portion of a wide area network (WAN), such as the Internet, or other network, if applicable.

The computer-readable medium 102 and other applicable systems or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In the example of FIG. 1A, the time-synchronized video capture devices 104 are intended to represent a plurality of devices configured to capture video content at the same time (i.e., in a time-synchronized manner). "Video content," as used herein, may refer to a series of images of an area of interest taken over a specified time. Depending upon implementation- and/or configuration-specific considerations, video content can include corresponding audio content and, in applicable instances, the time-synchronized video capture devices 104 can instead be referred to as time-synchronized multimedia capture device(s). It may be noted audio capture device(s) need not be incorporated into the same device as the time-synchronized video capture devices 104, and can be implemented as separate devices (not shown) coupled to the computer-readable medium 102. It may further be noted some techniques described in this paper are applicable to time-synchronized image capture devices that take (or can be configured to take) snapshots.

The time-synchronized video capture devices 104 may comprise engines, datastores, and/or other components of a computer system. For example, the time-synchronized video capture devices 104 can be coupled to or form a part of smartphones, tablet computers, Internet of Things (IoT) devices, or the like. The time-synchronized video capture devices 104 may be coupled to and/or part of an unmanned vehicle(s), such as an unmanned aerial vehicle and/or drone.

In various implementations, the time-synchronized video capture devices 104 include sensors other than cameras for capturing video. For example, the time-synchronized video capture devices 104 can include orientation- or location-sensitive sensors, such as a gyroscope, an accelerometer, a GPS sensor, a magnetometer, and/or a rangefinder. The time-synchronized video capture devices 104 can also include sound sensors, such as microphones or ultrasonic sensors, alternative light sensors, such as light sensors that capture images outside of the visible light range, thermometers or thermocouples, pressure or flow sensors, potentiometers and force-sensing resistors, humidity sensors, gas sensors, PIR motion sensors, acceleration sensors, displacement sensors, force measurement sensors, color sensors, gyro sensors, and other sensors.

For sensors that detect stimuli traveling at different speeds, sensor distance is of critical importance to determine an offset when correlating relatively slow-moving stimuli (such as sound) with relatively fast-moving stimuli (such as light). As used here, "relatively" refers to the stimuli being compared (e.g., sound and light, respectively). The offset is optional in the sense it may be desirable to have a realistic time-delay for sound, such as when observing a batter hit a ball and hearing the crack of the impact of bat to ball shortly thereafter. However, as the physical area(s) of interest increase in size, the different sounds at the video capture devices become increasingly disconcerting. In a specific implementation, the sound recording of only one of the video capture devices 104 is used. In an alternative implementation, not shown in the figures, one or more dedicated sound recording devices can be placed in close proximity to the source of the sound. As used here, close proximity means closer to the source of sound than at least one video capture device for the purpose of capturing sound with a smaller offset than would be necessary if the sound was received at the at least one video capture device.

An advantage of using time-synchronized devices is frames can be aligned for various perspectives without substantial pre-processing. Introducing offsets for sound can increase the amount of pre-processing, but, in at least some implementations, minimizing the pre-processing is desirable. A technique for reducing pre-processing requirements for sound offsets involves providing a tagging mechanism for objects in the physical areas of interest. For example, baseball players are routinely given articles that facilitate easy identification of the runners (such as uniforms with numbers on them). The visual identification techniques can be augmented by providing a microphone in association with the identifying article, which may or may not also include a passive or active component used for determining the present location of the object and/or the microphone. When the object is viewed (including zooming in on the object from a larger composite image), the sound feed can be correlated to the appropriate frame of the video feed by matching a sound in space-time with the applicable frame.

In a specific implementation, a sound-recording device is time-synchronized with the time-synchronized video capture devices 104 using a sound offset. That is, the time-synchronized video capture devices 104 operate at a slight delay relative to the sound recording device. In the most basic implementation, a sound recording device is placed at a distance from a focal point and a video recording device is placed at a second distance from the focal point. For simplicity, it can be assumed the time it takes for light to travel from the focal point to the second distance is 0 because the frame rate of video recording devices, even those operating at high frame rates (e.g., 240 FPS) cannot detect a time-delay between a first object that is near and a second object that is all the way on the other side of, for example, a large arena. However, the time it takes for sound to travel from first and second objects on opposite sides of an arena (one near and one far) to the video recording device can be significantly different, as is demonstrated when a baseball player hits a ball and the crack is heard immediately by the catcher, but moments later by fans in the stands. To offset this phenomenon, video can be offset by d/c, where d is the distance of the recording device from the focal point and c is the speed of sound.

In the example of FIG. 1A, the physical area(s) of interest 106 are intended to represent a physical space that can be imaged by one or more of the time-synchronized video capture devices 104. The physical area(s) of interest 106 may correspond to a relevant space around a person, such as an athlete, a performer, or other person whose actions are recorded by the time-synchronized video capture devices 104. In some implementations, the physical area(s) of interest 106 comprise a single physical area of interest that corresponds to the boundaries around a specific person being recorded at a specific time by the time-synchronized video capture devices 104. In various implementations, the physical area(s) of interest 106 comprise multiple physical areas of interest that correspond to boundaries around a single person being recorded at different times by the time-synchronized video capture devices 104. In various implementations, the physical area(s) of interest 106 comprise multiple physical areas of interest that correspond to boundaries around one or more persons being recorded at different times by the time-synchronized video capture devices 104.

In the example of FIG. 1A, the physical area(s) of interest 106 have visible portions 114 that are intended to represent conceptual windows into the physical area(s) of interest 106 through which the time-synchronized video capture devices 104 capture images. As is illustrated in the example of FIG. 1A, the visible portions 114 of the physical area(s) of interest 106 correspond to the fields of view 116 of the time-synchronized video capture devices 104. Thus, the time-synchronized video capture devices 104 can be characterized by a field of view 116 that corresponds to the extent of the observable world that is seen at any given moment (or over a period of time) by the time-synchronized video capture devices 104 that is associated with the physical area(s) of interest 106. In the example of FIG. 1A, the field of view 116 is directed toward the visible portions 114 of the physical area(s) of interest 106. In this example, the field of view 116 encompasses no more than the visible portions 114, but it should be understood the field of view could encompass more than just the visible portions 114 of the physical area(s) of interest 106, making portions of the captured images extraneous. It may be desirable to avoid extraneous portions of images by orienting the time-synchronized video capture devices 104 appropriately. Alternatively or in addition, extraneous portions of images can be clipped to yield only the visible portions 114 of the physical area(s) of interest 106.

The visible portions 114 may, but need not, depend on the orientations of the time-synchronized video capture devices 104. As an example, the visible portions 114 may overlap with one another (e.g., the first visible portion 114(1) may overlap with the Nth visible portion 114(N)). As another example, the visible portions 114 may comprise perspectives of the physical area(s) of interest 106 that are at least in part orthogonal to one another (e.g., the first visible portion 114(1) may comprise a top-down perspective of the physical area(s) of interest 106 while the Nth visible portion 114(N) may comprise a lateral perspective of the physical area(s) of interest 106). As yet another example, the first visible portion 114(1) may comprise a first lateral of the physical area(s) of interest 106 while the Nth visible portion 114(N) may comprise a second lateral perspective of the physical area(s) of interest 106. It is noted other combinations of perspectives are possible without departing from the scope and substance of the inventive concepts described herein.

In a specific implementation, the time-synchronized video capture management system 108 can use sensors, such as a thermometer and/or a humidity detector, to estimate the speed of sound in a given environment. The speed of sound, c, varies depending upon air temperature, humidity, and other factors. For example, if the sensors (or a weather report) indicate the temperature is 0 C with 0% humidity at sea level, c can be estimated to be about 331.3 m/s. Assuming a focal point 331 meters from a video recording device operating at 120 FPS, the sound offset is 120 frames. That is, the sound that is heard one second after an event is applicable to a frame 120 frames before the video recording device detected the sound. Moreover, the applicable frame is determinable at any point between the focal point and some other video recording device for which the distance is known using the formula −FPS×d/c. Specifically in the above example, the applicable frame offset is −120 frames/s×(331 m)/(331 m/s)=−120 frames.

A reason for ensuring video recording devices are time-synchronized is to ensure the frames line up on feeds from each device. If two recording devices record at 120 FPS, but one starts recording ½₄₀ of a second before the other, the frames are mismatched. If mismatched frames are stitched together, the visual experience is diminished by introducing a "jerkiness" to the video feed when perspective changes from one camera to the next. Sounds must also be carefully time-synchronized with video to avoid, for example, having sounds not perfectly correspond to images within frames. To this end, the start time of a sound recording is pinned to the start of the first frame and is at least conceptually broken into segments of a duration equal to 1/FPS. Thus, for a 120 FPS feed, the sound segments are each $\frac{1}{120}^{th}$ of a second long and the start of any given segment is pinned to the start of the corresponding frame. Advantageously, pinning sound segments to frames requires relatively little consumption of compute, enabling the pinning to be accomplished in real-time with a relatively small delay, perhaps around 3 seconds for a feed that includes a focal point about 1 km from the applicable sensor.

In a specific implementation, the time-synchronized video capture devices 104 are arranged at different orientations around the physical area(s) of interest 106 in order to capture different perspectives of the physical area(s) of interest 106. As an example, the time-synchronized video capture devices 104 may be oriented around the physical area(s) of interest 106 so that a portion of the first field of view 116(1) of the first time-synchronized video capture devices 104(1) overlaps with a portion of the Nth field of view 116(N) of the Nth time-synchronized video capture devices 104(N). As another example, the time-synchronized video capture devices 104 may be oriented around the physical area(s) of interest 106 so that a portion of the first field of view 116(1) of the first time-synchronized video capture devices 104(1) is orthogonal with a portion of the Nth field of view 116(N) of the Nth time-synchronized video capture devices 104(N).

In some implementations, the time-synchronized video capture devices 104, when arranged, are mounted on one or more stands or frames and/or facilitate video capture of the physical area(s) of interest 106 from various perspectives. The one or more stands or frames can be configured into an arbitrary or non-arbitrary shape, such as a dome, sphere, hemisphere, cylinder, oval, line, plane, cube, or other shape. In some implementations, the spaces at which the time-synchronized video capture devices 104 are to be placed can be pre-marked, such as by putting an 'x' at locations around a potential area of interest. Moreover, if the positions are pre-plotted, it makes determination of locations relatively trivial for other components with a need to know the various locations.

In a specific implementation, a portion of the time-synchronized video capture devices 104 is configured to move with an object in the physical area(s) of interest 106. For instance, the time-synchronized video capture devices 104 may be mounted on a platform that moves along with an object in the physical area(s) of interest. Instead or in addition, the time-synchronized video capture devices 104 can change the field(s) of view 116 to accommodate an object moving in the physical area(s) of interest 106. For example, the time-synchronized video capture devices 104 may be configured to rotate around a base to follow an object within the physical area(s) of interest 106. In a specific implementation, the time-synchronized video capture devices 104 and/or the field(s) of view 116 follow an object using an object (a fob, a beacon, etc.) on the object in the physical area(s) of interest 106. In general, it is less important for omnidirectional sensors, such as microphones, to move with an object, though it can be important to track distance from the object for the purpose of computing, e.g., a time-variable sound offset, or for switching from a first microphone to a second microphone as an object traverses a path, such as a racetrack or bases on a baseball field.

In a specific implementation, the time-synchronized video capture devices 104 are arranged according to a Cartesian coordinate system and/or substantially Cartesian coordinate system in which three-dimensional positional coordinates are assigned to positions in space. For example, the time-synchronized video capture devices 104 may have coordinates in space and/or relative to the physical area(s) of interest. Alternatively or in addition, the time-synchronized video capture devices 104 may have their orientations defined by an axis orthogonal to a reference point/plane (e.g., a face, a lens, etc.) on or associated with the time-synchronized video capture devices 104. Overlapping and/or orthogonal orientations of the time-synchronized video capture devices 104 may, as described further herein, capture various perspectives of the physical area(s) of interest 106.

In the example of FIG. 1A, the time-synchronized video capture management system 108 is intended to represent a device that uses one or more automated agents to control the time-synchronized video capture devices 104 and to manage provisioning of stitched video data structures for playback. Generally, the time-synchronized video capture management system 108 manages a plurality of video feeds from the corresponding plurality of time-synchronized video capture devices 104. The example of FIG. 1A is intended to illustrate the time-synchronized video capture devices 104 transferring video content to the time-synchronized video capture management system 108 over the computer-readable medium 102. For example, the time-synchronized video capture management system 108 may include engines and/or datastores configured to instruct the time-synchronized video capture devices 104 to synchronize with one another, to identify viewer perspectives, to identify orientations of the fields of view 116 that relate to those viewer perspectives, to capture video content of the physical area(s) of interest 106, to select fields of view 116, to configure the time-synchronized video capture devices 104, and to gather from the time-synchronized video capture devices 104 video content of the physical area(s) of interest 106. It should be understood some or all of the functionality of the time-synchronized video capture management system 108 can be shared across one or more of the time-synchronized video capture devices 104 and/or the playback device(s) 110.

In a specific implementation, the time-synchronized video capture devices 104 stream the video content to the time-synchronized video capture management system 108 as the video content is captured (e.g., in real-time), with a time-delay corresponding to pinned sound segments (e.g., n-second delayed near real-time), before, after, or around time-synchronization triggers (e.g., limited batches), in batches of predetermined or configurable length that may be related to video or multimedia buffer size (e.g., periodic batches), or as a single batch when recording is complete. In various implementations, the time-synchronized video capture devices 104 implement a batch uploading process in which saved video content is uploaded to the time-synchronized video capture management system 108 over the computer-readable medium 102 at a specified time or upon occurrence of a specified sharing trigger. In some implementations, the time-synchronized video capture devices 104 only transfer portions of video content marked or otherwise designated as relevant to a specified activity. The time-synchronized video capture management system 108 performs some preprocessing (such as stitching video feeds) and provides the resulting data structure (such as a stitched video data structure) to the playback device(s) 110. The time-synchronized video capture management system 108 may be implemented in a distributed fashion with functionality implemented on one or more of the time-synchronized video capture devices 104 and/or the playback device(s) 110.

In a specific implementation, the time-synchronized video capture management system 108 includes a master clock to which the time-synchronized video capture devices 104 are synched. As was mentioned above, functionality of the time-synchronized video capture management system 108 may or may not be distributed across other devices. For example, the time-synchronized video capture devices 104 could include a master time-synchronized video capture device and slave time-synchronized video capture device(s). Continuing this example, after capturing video content of the physical area(s) of interest 106, the slave time-synchronized video capture device(s) sends video content to the time-synchronized video capture management system 108 or to the master time-synchronized video capture device, which provides the video content to the time-synchronized video capture management system 108 (which may or may not be implemented on the master time-synchronized video capture device) and to the playback device(s) 110.

In a specific implementation, the time-synchronized video capture management system 108 marks orientations of the time-synchronized video capture devices 104 with orientation markers. An "orientation marker," as used herein, refers to a data structure that marks an orientation of one of the time-synchronized video capture devices 104. The orientation markers may include information related to the location (global location, relative location relative to the physical area(s) of interest 106, etc.) of a time-synchronized video capture devices 104. In various implementations, the orientation markers include Cartesian coordinates and/or parameters of an axis orthogonal to a reference point/plane (e.g., a face, a lens, etc.) of a time-synchronized video capture devices 104. Instead or in addition, the time-synchronized video capture management system 108 can mark feeds associated with the visible portions 114 of the physical area(s) of interest 106 with orientation markers. Advantageously, the orientation markers include data sufficient to convey camera position information to the time-synchronized video capture management system 108 so as to enable the time-synchronized video capture management system 108 to stitch the various video feeds from the time-synchronized video capture devices 104 together such that the various video feeds are correlated with the camera positions of the time-synchronized video capture devices 104 that captured the various video feeds within the stitched video data structure or a representation thereof.

In a specific implementation, the time-synchronized video capture management system 108 creates a three-dimensional dome representation of the one or more physical area(s) of interest 106 using video content obtained from the time-synchronized video capture devices 104 and orientation markers of orientations of the time-synchronized video capture devices 104 (and/or the feeds associated therewith). A "three-dimensional dome representation," as used herein, refers to a representation of a frame onto which the cumulative video content captured by multiple time-synchronized video capture devices 104 of the physical area(s) of interest 106 over time-synchronized periods of time and stitched together in a three-dimensional fabric can be conceptually affixed. It should be noted a "dome" need not be a smooth arc, and, as used herein, can comprise multiple flat faces. A three-dimensional dome representation may use one or more orientation markers to identify orientations of video content relative to other video content included in the data structure, or relative to some other baseline metric. As used in this paper, the three-dimensional dome representation is assumed to be a portion of a dome, such as a half-dome, but could include a full dome or even a sphere. More generally, the frame can be referred to as a three-dimensional (partial or full) enclosure that could correspond to any shape that has two or more inward-facing angles that correspond to camera positions and could include any shape up to an including one that fully encompasses a space, such as the aforementioned sphere or some other shape, such as an oval, a tube, etc.

In a specific implementation, the time-synchronized video capture management system 108 creates a stitched video data structure of physical area(s) of interest 106 by constructively placing the various video feeds on the three-dimensional enclosure in accordance with orientations of cameras of the time-synchronized video capture devices 104. A stitched video data structure, as used herein, includes video content associated with visible portions 114 of physical area(s) of interest 106 arranged such that the various video feeds are oriented to match the orientations of the cameras used to capture the video feeds.

In a specific implementation, a stitched video representation of a stitched video data structure includes one or more perspective UI elements that mark perspectives associated with the fields of view 116. In some implementations, the perspective UI elements comprise floating virtual objects (e.g., floating polygons, floating shapes, floating characters, etc.) superimposed on portions of the stitched video representation that correspond to applicable perspectives. Depending upon implementation- and configuration-specific considerations, the perspective UI elements can be active or passive. For example, active perspective UI elements can allow a reviewer to select perspectives in the stitched video representation at a specific time, such as by enabling a user to "grab" a perspective UI element and rotate a three-dimensional enclosure representation to a different perspective of the stitched video than the one currently displayed (e.g., giving the reviewer the ability to switch between perspectives similar to those of the cameras that captured the perspectives). For example, passive perspective UI elements can indicate a current perspective (e.g., by giving a compass direction or some other indication of orientation), but have no corresponding activation function other than to provide information. In a specific implementation, a mesh of active and/or passive perspective UI elements are conceptually superimposed over the various video feeds in a manner that is agnostic of the video content, but they may or may not be visible, depending upon the current perspective. For example, an active perspective UI element may only be visible as superimposed on a video feed of a current perspective and may or may not be visible as superimposed over an adjacent perspective. Alternatively, all or a different subset of the active perspective UI elements can be transparent so as to enable interaction with the stitched video representation, but without visibly interposing themselves between a reviewer and the video feeds. Depending upon implementation- and/or configuration-specific factors, as a stitched video representation is moved from one perspective to the next, one of the video feeds can play continuously until the perspective is fully changed to the next video. Alternatively, the currently-playing video can be paused. Advantageously, the reviewer can move about the three-dimensional enclosure to observe the object of interest from the various perspectives in an intuitive fashion that keeps the perspective on the object of interest without substantial jitter when changing perspective due to the time-synchronization of the video content used to form the stitched video data structure.

Depending upon implementation- and/or configuration-specific considerations, three-dimensional enclosure representation may or may not accommodate different frame rates of video content from different synchronized video capture devices 104. As an example, a three-dimensional enclosure data structure may facilitate alignment of frames so that video content captured at 120 FPS is temporally aligned with video content captured at 240 FPS by matching the first frame of the 120 FPS feed to the first and second frames of the 240 FPS feed, the second frame of the 120 FPS feed to the third and fourth frames of the 240 FPS feed, and so forth. As another example, the number of frames in the slower feed could be doubled or every other frame in the faster feed could be omitted such that the stitched video representation appears to have a consistent frame rate across each perspective or a proper subset of the perspectives.

Sound segments can be pinned differently depending upon the apparent distance from the focal point of a given perspective. Advantageously, zooming in or out can change the apparent distance from the focal point and create different sound offsets and, correspondingly, changing the frames to which sound segments are pinned and, alternatively or in addition, the volume at which the sound segments are played (e.g., the sound segments are louder when zoomed in than when zoomed out). It may be desirable to control zoom speed or phase in sound segments to avoid zooming in so quickly that sound is played twice or zooming out so quickly that there is a span of time during which no sound segments are pinned to frames. In a specific implementation, zooming in, which can result in previously-played sound segments being replayed, can be accompanied by a sound similar to that heard when rewinding a cassette tape (aka a "rewind sound"). Alternatively or in addition, zooming out, which can result in skipping sound segments when the sound segments are re-pinned to later frames, can be accompanied by a static frame image as the sound segments are played and "catch up" to the current (newly zoomed out) frame.

In the example of FIG. 1A, the playback device(s) 110 are intended to represent devices that use one or more automated agents and user inputs to control display of various perspectives of stitched video data structures. The example of FIG. 1A is intended to illustrate the time-synchronized video capture management system 108 transferring stitched video data structures, or one or more perspectives thereof, to the playback device(s) 110. In various implementations, the playback device(s) 110 comprise one or more of a mobile phone, a tablet computing device, and other applicable devices. In a specific implementation, the time-synchronized video capture management system 108 streams the stitched video data structures, or one or more perspectives thereof, to the playback device(s) 110 when or soon after the time-synchronized video capture devices 104 capture video content of the physical area(s) of interest 106. Such an implementation facilitates substantially real-time review, which is intended to mean real-time or real-time with a short delay, of actions in the physical area(s) of interest 106. Such an implementation can instead or in addition facilitate concurrent review, which is intended to mean batched provisioning of feeds that enable the review of a current event, but with a significant delay due to batch processing of feeds that are provided to playback device(s) 110 prior to the end of the current event. Techniques described in this paper can also improve systems that use recorded playback.

In a specific implementation, the time-synchronized video capture management system 108 provides stitched live feeds, delayed live feeds, or recorded feeds to the playback device(s) 110 upon occurrence of specified conditions and/or in response to requests from the playback device(s) 110. In any case, the time-synchronization of the video capture devices ensures the first frames of each feed are time-synchronized and subsequent frames have correspondingly synchronized frames in other feeds that are stitched together.

In the diagram 100A, the playback device(s) 110 include a graphical interface 112 that is intended to represent an interface to facilitate reviewer interaction with stitched video representations. In various implementations, the graphical interface 112 comprises a graphical user interface, including but not limited to a graphical menu-driven interface, a touchscreen display, a voice-activated display, etc. In various implementations, the interactions comprise interactions with the video content (stop, pause, play, rewind, fast-forward, zoom, shrink, rotate, resize, etc.). The interactions may also comprise selection of different perspectives of the physical area(s) of interest 106 using the perspective UI elements.

Figure 1B:
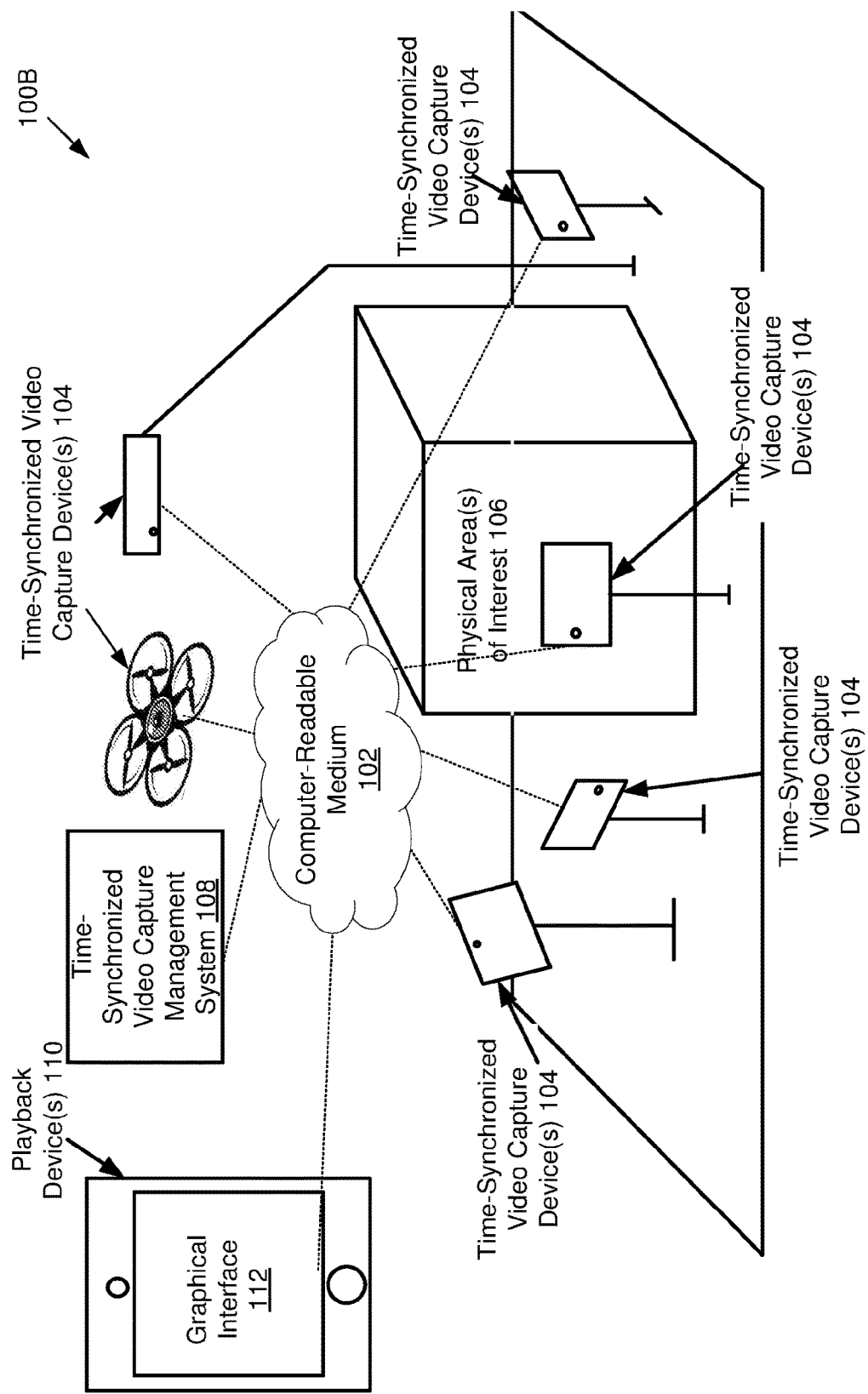
FIG. 1B depicts a diagram of an example of a time-synchronized video capture environment.

FIG. 1B depicts a diagram 100B of an example of a time-synchronized video capture environment. The diagram 100B includes the computer-readable medium 102, the time-synchronized video capture devices 104, the physical areas(s) of interest 106, the time-synchronized video capture management system 108, and the playback device(s) 110. In the example of FIG. 1B, the physical area(s) of interest 106 is intended to show a single physical area of interest. The physical area(s) of interest 106 is shown as a cube, but in various implementations, can comprise any arbitrary or non-arbitrary size and shape.

In the example of FIG. 1B, the time-synchronized video capture devices 104 comprise four applicable devices mounted on stands around the physical area(s) of interest. As shown in FIG. 1B, a first of the time-synchronized video capture devices 104 is oriented toward a left face of the physical area(s) of interest 106. A second of the synchronized video capture devices 104 is oriented toward a left-front corner of the physical area(s) of interest 106. A third of the synchronized video capture devices 104 is oriented toward a front face of the physical area(s) of interest 106. A fourth of the synchronized video capture devices 104 is oriented toward a right face of the physical area(s) of interest 106. A fifth of the time-synchronized video capture devices 104 is mounted on a pole that extends over the top of the physical area(s) of interest 106 and oriented toward a top face of the physical area(s) of interest 106. A sixth of the time-synchronized video capture devices 104 is installed on an unmanned aerial vehicle and oriented toward the top face of the physical area(s) of interest 106.

In a specific implementation, the time-synchronized video capture management system 108 gathers video content from each of the time-synchronized video capture devices 104. The time-synchronized video capture management system 108 may identify and/or mark orientations of the time-synchronized video capture devices 104 in relation to the physical area(s) of interest 106, as described previously with reference to FIG. 1A. For example, the time-synchronized video capture management system 108 can mark each of the time-synchronized video capture devices 104 with Cartesian coordinates relative to the physical area(s) of interest 106 and/or identify angles of an axis that is orthogonal to a reference point in the time-synchronized video capture devices 104 and that connects the time-synchronized video capture devices 104 with the physical area(s) of interest 106.

In a specific implementation, the time-synchronized video capture management system 108 creates a three-dimensional cubic representation of the video content from the time-synchronized video capture devices 104. The time-synchronized video capture management system 108 may create a stitched video representation of the one or more areas of interest using the three-dimensional cubic or rectangular-on-a-subset-of-sides representation of the physical area(s) of interest 106. Alternatively or in addition, the time-synchronized video capture management system 108 can create a three-dimensional spherical or semi-spherical (e.g., dome-shaped) representation of the video content from the time-synchronized video capture devices 104. Alternatively or in addition, the time-synchronized video capture management system 108 can create a three-dimensional polyhedron (e.g., an octagonal prism) or portion thereof representation of the video content from the time-synchronized video capture devices 104 or a three-dimensional shape that is equivalent in shape to tiling on a sphere or semi-sphere. The time-synchronized video capture management system 108 may provide the stitched video representation of the physical area(s) of interest 106 to the playback device(s) 110.

In the example of FIG. 1B, the playback device(s) 110 are intended to illustrate a way to allow a reviewer to interact with the stitched video representation. In various implementations, the interactions may comprise interactions with the video content (stop, pause, play, rewind, fast-forward, zoom, shrink, rotate, resize, etc.). The interactions may also comprise selection of different perspectives of the physical area(s) of interest 106 using the perspective UI elements.

Figure 1C:
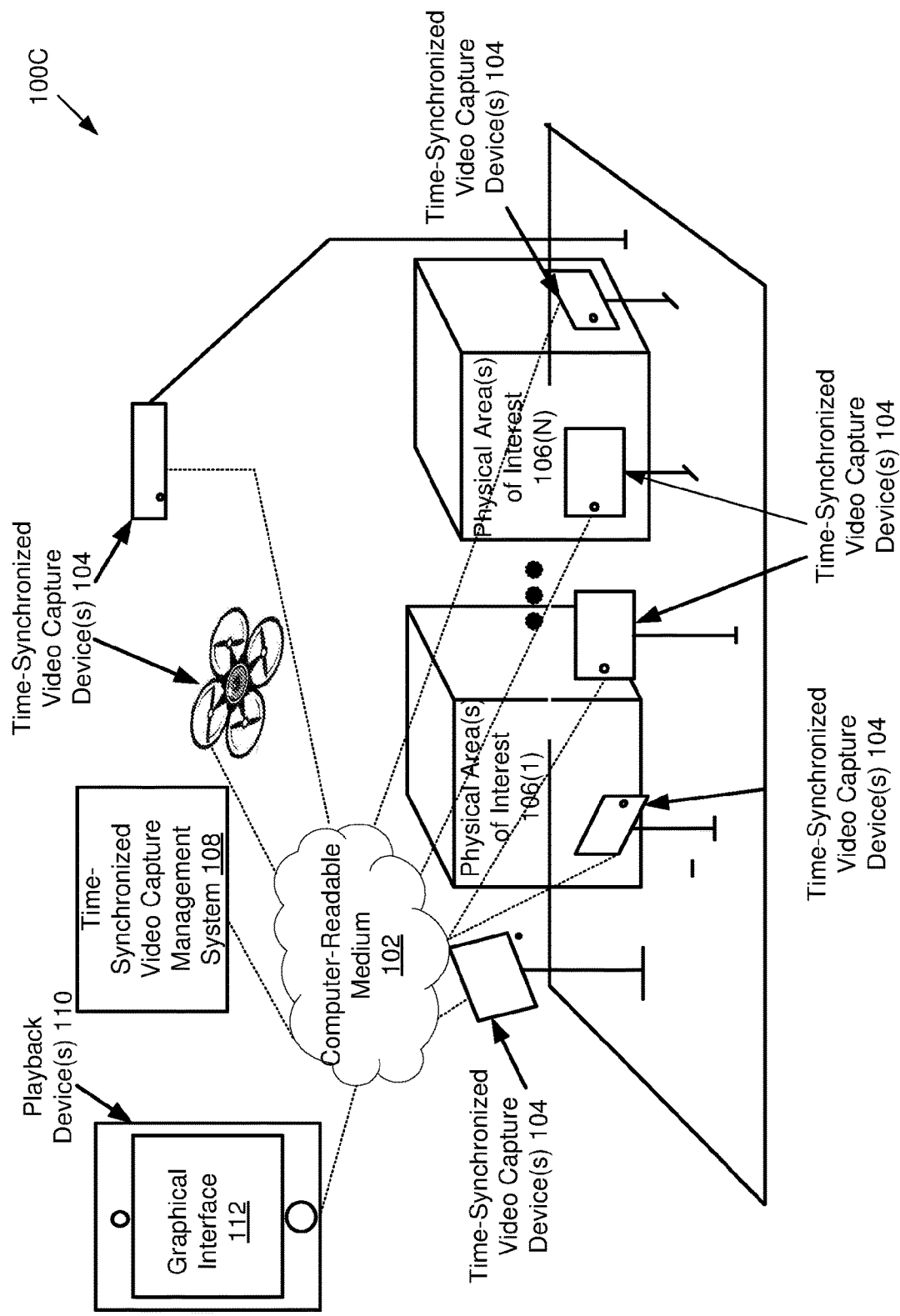
FIG. 1C depicts a diagram of an example of a time-synchronized video capture environment.

FIG. 1C depicts a diagram 100C of an example of a time-synchronized video capture environment. The diagram 100C includes the computer-readable medium 102, the time-synchronized video capture devices 104, the physical areas(s) of interest 106, the time-synchronized video capture management system 108, and the playback device(s) 110.

In the example of FIG. 1C, the physical area(s) of interest 106 comprise multiple discrete physical area of interest. The physical area(s) of interest 106 are shown as multiple cubes, but in various implementations, can comprise a plurality of arbitrary or non-arbitrary sizes and shapes. In a specific implementation, the time-synchronized video capture devices 104 operate to capture different portions of the physical area(s) of interest 106 depending on the location of an object within the physical area(s) of interest. For example, a portion of the time-synchronized video capture devices 104 can be configured to move with an object in the physical area(s) of interest 106. To facilitate this movement, the time-synchronized video capture devices 104 may be mounted on a platform that moves along with an object in the physical area(s) of interest. Depending upon implementation- and/or configuration-specific considerations, the time-synchronized video capture devices 104 can be configured to change their fields of view to accommodate an object moving in the physical area(s) of interest 106. For example, the time-synchronized video capture devices 104 can be configured to rotate around a base to follow an object within the physical area(s) of interest 106. Alternatively or in addition, the time-synchronized video capture devices 104 and/or their fields of view can follow an object using a device (a fob, a beacon, etc.) on the object in the physical area(s) of interest 106.

Figure 1D:
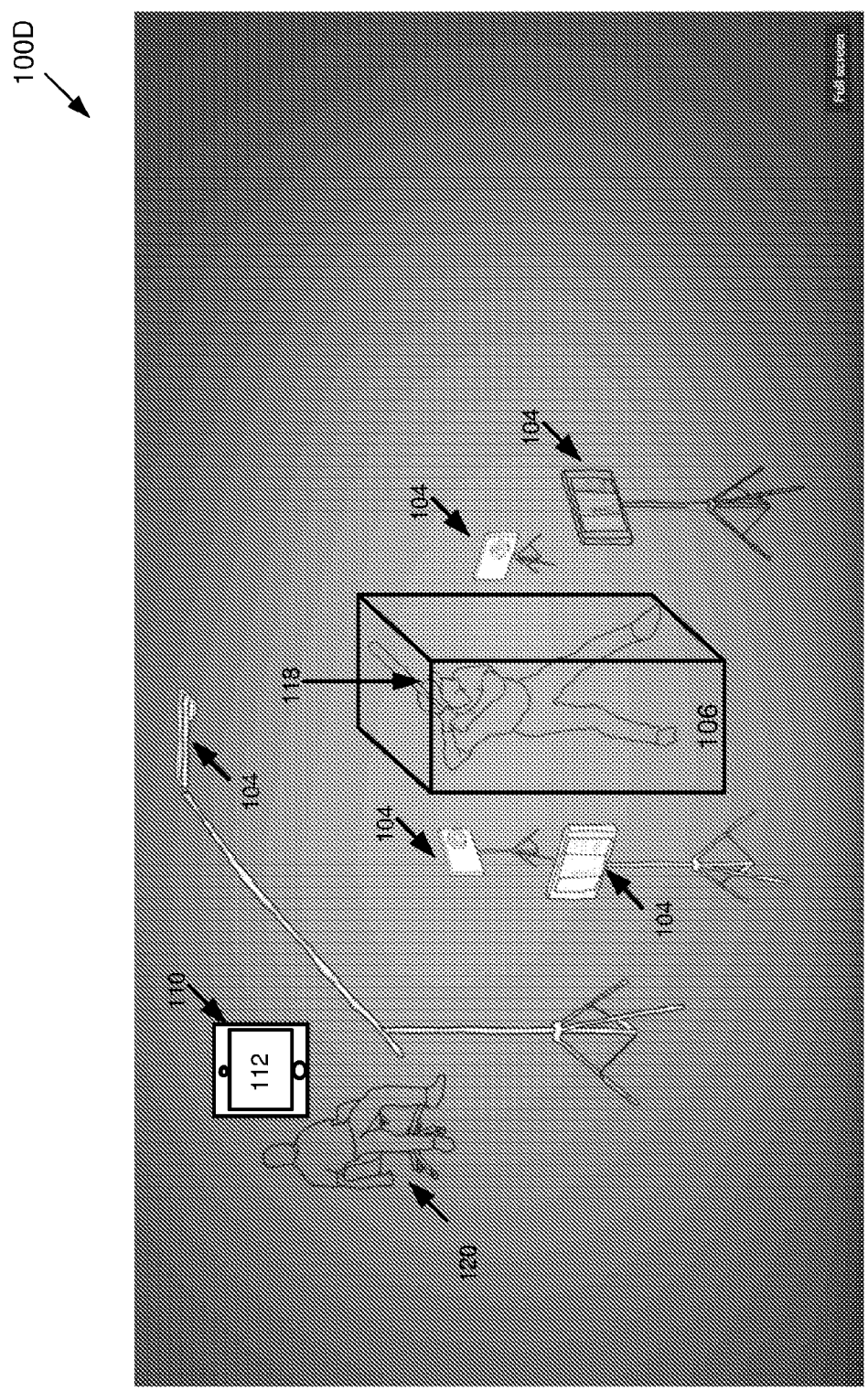
FIG. 1D depicts a diagram of an example of a time-synchronized video capture environment.

FIG. 1D depicts a diagram 100D of an example of a time-synchronized video capture environment. The diagram 100D includes the time-synchronized video capture devices 104, the physical areas(s) of interest 106, and the playback device(s) 110. The diagram 100D further includes an object 118 and a reviewer 120. In this example, the object 118 appears to be a baseball player at bat. The physical area(s) of interest 106 may comprise a relevant area around the object 118 where the object's actions (e.g., batting a ball) is of interest. The time-synchronized video capture devices 104 may capture actions of the object 118 using the techniques described herein. The reviewer 120 may review, on the playback device 110, a stitched video representation of the physical area(s) of interest 106 at a specified time (e.g., when the batter, which is object 118 in this example, is attempting to hit a ball).

Example Time-Synchronized Video Capture Device

Figure 2:
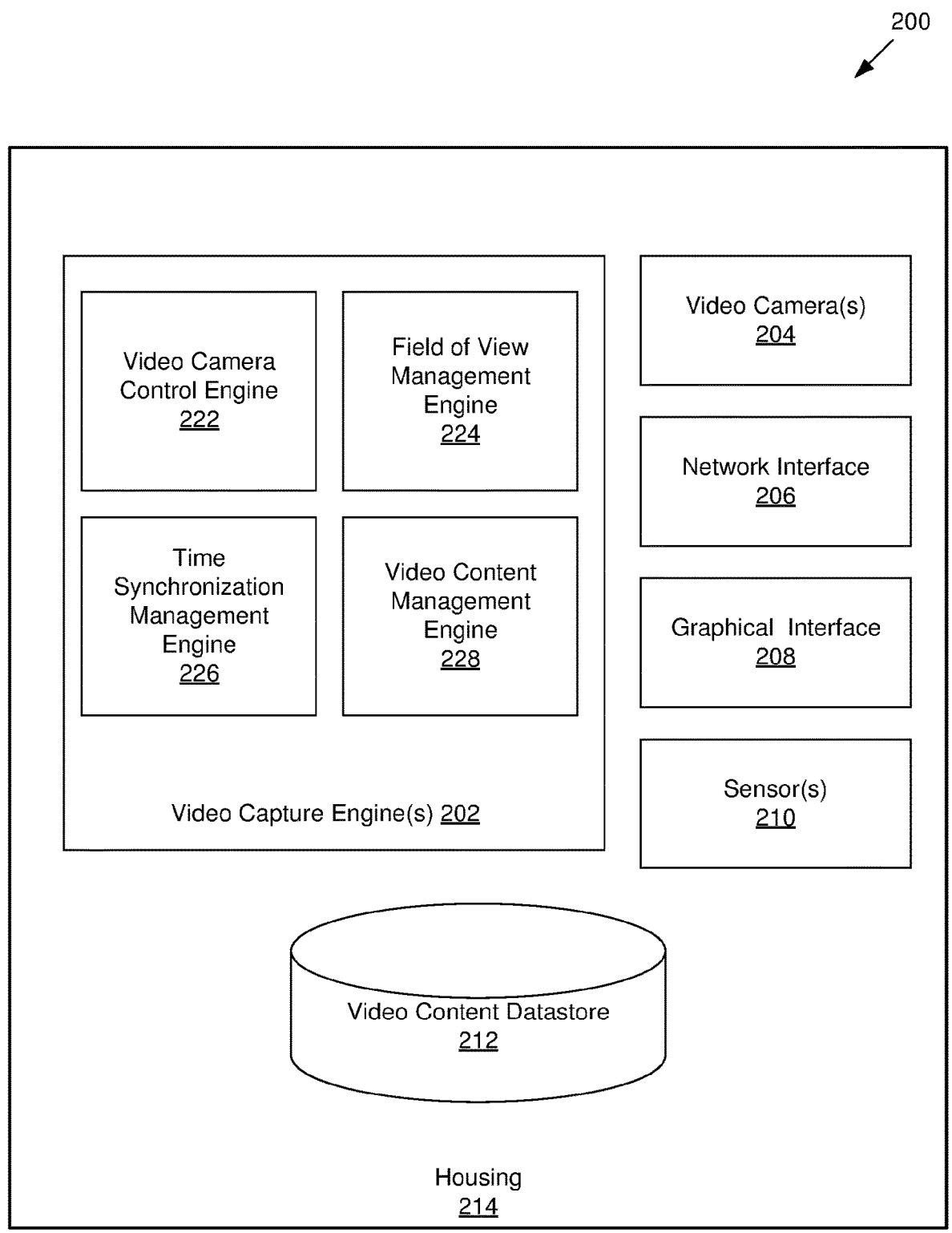
FIG. 2 depicts a diagram of an example of a time-synchronized video capture device.

FIG. 2 depicts a diagram 200 of an example of a time-synchronized video capture device. The diagram 200 includes video capture engine(s) 202, video camera(s) 204, a network interface 206, a graphical interface 208, sensor(s) 210, a video content datastore 212, and a housing 214. In the example of FIG. 2, the video capture engine(s) 202 include a video camera control engine 222, a field of view management engine 224, a time synchronization management engine 226, and a video content management engine 228.

The video camera control engine 222 is intended to represent a device that uses one or more automated agents to process instructions to manage the video camera(s) 204. Advantageously, the automated agents act on behalf of a larger system to ensure each video camera fulfils its role as part of a set of time-synchronized video capture devices without human interaction, which would tend to make impossible the maintenance of time-synchronization and/or the generation of feeds that can be stitched together properly. The video camera control engine 222 may include drivers and/or control circuitry to instruct the video camera(s) 204 to initiate, end, etc. recording of video content. Instructions to manage the video camera(s) 204 may come from time-synchronized video capture management system over the network interface 206, or from rules input to the device manually (e.g., via a flash memory device or graphical user interface).

The field of view management engine 224 is intended to represent a device that uses one or more automated agents to establish a field of view suitable for capturing a portion of a physical area of interest (see, e.g., FIGS. 1A-1D). In a specific implementation, the field of view management engine 224 is responsive to adjustments to physical placement of a time-synchronized video capture device and/or orientation or configuration of the video camera(s) 204. For example, a human can place a time-synchronized video capture device in an attempt to establish a desirable field of view. In this example, the field of view management engine 224 provides feedback regarding whether the field of view is ideal or adequate. In the example in which a human is adjusting the orientation of the device, the feedback can be provided via the graphical interface 208 (or through some other machine-to-human interface). In an example in which the time-synchronized video capture device is mounted on an automated mobile platform (not shown), the field of view management engine 224 can instruct a mobile platform controller to move the mobile platform so as to achieve a desirable orientation for the video camera(s) 204. In this example, feedback may or may not be necessary depending upon how the mobile platform controller receives instructions and how precise the mobile platform is in positioning the video camera(s) 204. The field of view management engine 224 can work across devices to coordinate field of views for multiple time-synchronized video capture devices, either by establishing a first time-synchronized video capture device as the baseline (unmoving) device or by dynamically adjusting any or all of the various devices to capture a desired combination of fields of view.

In a specific implementation, the field of view management engine 224 receives parameters about an intended field of view (e.g., relevant angles, relevant objects to focus on, relevant distances from objects, etc.). Corresponding instructions can be relayed to a human or mobile platform for initial placement of the time-synchronized video capture device, as described above, and to the video camera(s) 204, via the video camera control engine 222, to rotate, move, etc. so that an appropriate field of view is displayed thereon. For example, assuming the video camera(s) 204 can adjust field of view (e.g., via zoom or other controls), the video camera control engine 222 can instruct the video camera(s) 204 to modify field(s) of view in response to instructions from the field of view management engine 224. The intended field of view may, but need not, be related to a desired perspective of physical area(s) of interest. Advantageously, the automated agents can ameliorate the risk associated with humans providing on-the-fly field of view adjustments, which can result in feeds that are not optimal for stitching.

The time synchronization management engine 226 is intended to represent a device that uses one or more automated agents to process instructions to synchronize video capture by the video camera(s) 204 with video cameras of other time-synchronized video capture devices, or images captured therethrough. Advantageously, automated agents can accomplish time-synchronization across multiple time-synchronized video capture devices in a manner that humans simply cannot do. For example, for multiple 120 FPS cameras to be properly time-synchronized, humans at the various devices who press start at the "same time" would be off by potentially dozens of frames.

In a specific implementation, the time synchronization management engine 226 uses time synchronization triggers to begin or end recording at a time before, at, or after the time synchronization trigger is activated. With respect to beginning or ending a recording before the time synchronization trigger is activated, a feed can be buffered to enable a recording to start or end at a time prior to the activation. Indeed, the act of "starting a recording" can be problematic without relatively instantaneous activation of a camera, making buffering prior to starting the recording particularly desirable in some implementations. For example, feed(s) from the video camera(s) can be buffered or otherwise stored in the video content datastore 212 at a specified time and/or before, upon, or after the occurrence of a specified time synchronization trigger. Instead or in addition, the video camera(s) 204 can record continuously, but only buffer a subset of the recorded content (or store a subset of the recorded content for batch processing). In various implementations, the time synchronization management engine 226 monitors (actively or passively) the video camera(s) 204, network interface 206, the graphical interface 208, and/or the sensor(s) 210 for events associated with a time-synchronization trigger.

A "time synchronization trigger," as used herein, refers to an event, the occurrence of which results in the video camera(s) 204 initiating video recording or enabling the time synchronization management engine 226 to identify a starting frame for a feed stored in the video content datastore 212 that was previously or concurrently captured by the video camera(s) 204. The occurrence of the event can also be referred to as a time synchronization stimulus. Examples of time synchronization stimuli include clock signals (e.g., from timers/alarms or clocks), specific sounds (e.g., the sound of a bat or golf club hitting a ball, the sound of a bat or golf club swinging, the sound of a punch/kick, the sound of ice skates moving across an ice rink, etc.), electromagnetic signals (e.g., visible light enabling identification of specific actions in an activity or responses to an event using machine vision, such as determining a person was punched by observing a bodily reaction to the punch), motion (e.g., detected using a motion-detector). Time synchronization stimuli can also come from a device (e.g., a fob, a beacon, etc.) that is associated with a physical position of a subject. Time synchronization stimuli may or may not be detected by the sensor(s) 210. A relatively simple time synchronization trigger is simply an explicit start time for an event. Advantageously, the time synchronization management engine 226 can use the time synchronization triggers to mark or otherwise designate portions of video content relevant to an activity. The video camera control engine 222 instructs the video camera(s) 204 to initiate recording in response to a time synchronization trigger, which is at least an explicit instruction to start recording, specified by the time synchronization management engine 226.

The video content management engine 228 is intended to represent a device that uses one or more automated agents to process instructions to manage video content captured by the video camera(s) 204. Advantageously, the video content management engine 228 can manage video content in near real-time (or at least has the capability of managing video content in near real-time). For example, in some implementations, video content can be recorded continuously both before a time synchronization trigger and after, but the video content management engine 228 may only transfer portions of video content that reside within a rules-based time span associated with a time synchronization trigger, before or after a synchronization trigger has occurred. The video content management engine 228 can control the contents of the video content datastore 212, including creating reading, updating, or deleting data structures.

Depending upon implementation- and/or configuration-specific considerations, time synchronization trigger can indicate all video content captured by the video camera(s) 204 is to be streamed or sent in batches, or a proper subset of the video content is to be streamed or sent in batches. The video content management engine 228 may store video content captured by the video camera(s) 204 in the video content datastore 212. Depending upon implementation- and configuration-specific considerations, the video content management engine 228 stream, with or without delay, or otherwise transmit, such as in one or more batch files, over the network interface 206 video content captured by the video camera(s) 204. Advantageously, as described, the video content management engine 228 can stream or send in batches all or a subset of video content buffered or otherwise stored in the video content datastore 212 with relatively little preprocessing. Depending upon implementation- and/or configuration-specific considerations, the video content management engine 228 can allow a human or automated agent to edit (filter, etc.) video content after the video content has been captured by the video camera(s) 204 via the graphical interface 208. However, because automated agents prevent frame misalignment that is inherent if humans have control over managing video content and speed the management operations sufficiently to enable real-time or near real-time stitching of the various feeds, in at least some implementations, the automated agents are responsible for frame alignment.

In a specific implementation, the video camera(s) 204 have a static frame rate that is the same for each of the video camera(s) 204. In this implementation, other video cameras capturing visible portions of a physical area of interest (see, e.g., FIGS. 1A-1D) can have the same static frame rate. The advantage of static frame rates across time-synchronized video capture devices is that the each frame of each camera is synchronized in time with each corresponding frame of the other cameras of interest. That is, frame 3 from the video feed of a first camera is synchronized in time with frame 3 from the video feed of a second camera (and, in fact, of every other camera of interest). Advantageously, frame-by-frame synchronization substantially reduces pre-processing requirements for the various feeds, and makes it easy to choose a subset of the various feeds that is of interest and can be readily aligned. When the first frame is known at the time synchronized video capture device, the video content management engine 228 can conceptually clip all frames before the first frame and start transmitting the feed (via streaming or in batches) starting with the first frame. Similarly, when the last frame is known at the time synchronized video capture device, the video content management engine 228 can conceptually clip all frames after the last frame and cease transmission of the feed when the last frame is reached.

In an alternative implementation, the video camera(s) 204 include cameras with different (configurable or static) frame rates. In this implementation, other video cameras capturing visible portions of a physical area of interest (see, e.g., FIGS. 1A-1D) can also have different (configurable or static) frame rates. As an example, a first of the video camera(s) 204 may capture images at 120 frames per second (FPS), while a second of the video camera(s) 204 (or a camera of a different time-synchronized video capture device) may capture images at 240 FPS. The time synchronization correlates the first frame of each of the various feeds with the understanding some frames may be dropped (from higher FPS feeds) or added (to lower FPS feeds). Sub-optimal stitching can occur when the feeds have mismatched frames, such as if one feed is 60 FPS and another feed is 100 FPS. In this example, the second frame of the 60 FPS feed is temporally located between the second and third frames of the 100 FPS feed. Depending upon implementation- and configuration-specific considerations, it may be desirable to find a lowest common denominator (LCD), which in the example of 60 FPS and 100 FPS is 10, and drop any frames that do not align with the 10 FPS framework. For example, if a coach is analyzing the swing of a golfer, the coach may find it more useful to sacrifice FPS to ensure the frames are, for practical purposes, perfectly time synchronized. If applicable, sound segments are at least conceptually pinned to the LCD frames. In other instances, it may be desirable to keep the frame rate higher to allow the feed to flow more like a modern movie, with the risk of jittery stitches or more blurry frames. For example, if a reviewer doesn't want to watch a frame with a highest captured frame rate, the feeds can be played at the speed of the current field of view such that when viewing a physical area of interest with a first view captured at 60 FPS, the feed is played at 60 FPS, but when changing to a second view associated with a 100 FPS camera, the feed is played at 100 FPS. (Changing between fields of view is discussed later in association with the playback device.) In other instances, a static FPS playback can be selected such that all feeds are reviewed at, e.g., 60 FPS, even if one or more are captured at 100 FPS. The video content management engine 228 may or may not be responsible for providing feeds at a prescribed FPS, depending upon implementation- and/or configuration-specific considerations; the adjustments can also be made at a time-synchronized video capture management system (described later).

In the example of FIG. 2, the video camera(s) 204 are intended to represent devices configured to capture video of portions of physical area(s) of interest. In some implementations, the video camera(s) 204 include lenses, focal hardware, sensors, storage media, etc. for gathering and/or storing video content. The video camera(s) 204 may include specialized and/or dedicated video cameras characterized by multiple focal points, higher shutter speeds than mobile phone cameras, etc. The video camera(s) 204 may include a depth camera (e.g., a combination of a depth sensor and a camera) configured to capture three-dimensional video content. As an example, the video camera(s) 204 may include a depth sensor that senses contours at specified distances away from the video camera(s) 204. The video camera(s) 204 may use data from the depth sensor in conjunction with image data from optical hardware to identify three-dimensional attributes of physical area(s) of interest. Alternatively, the video camera(s) 204 may include stereoscopic cameras, generally implemented as two or more light sensors with sufficient spatial diversity to capture a stereoscopic image.

In the example of FIG. 2, the network interface 206 is intended to represent drivers and/or control circuitry that facilitates communication over a computer-readable medium. The network interface 206 may comprise a device or other port of the time-synchronized video capture device 200.

In the example of FIG. 2, the graphical interface 208 is intended to represent drivers and/or control circuitry for providing output to and/or receiving input from a human. The graphical interface 208 is optional because the time-synchronized video capture device can be fully automated in some implementations. A specific example of a graphical interface 208 is a smartphone screen by which a person enters an instruction to allow the smartphone to act as a time-synchronized video capture device.

In the example of FIG. 2, the sensor(s) 210 are intended to represent hardware, drivers, and/or control circuitry configured to sense a physical property around the time-synchronized video capture device 200. In various implementations, the sensor(s) 210 include audio sensors configured to sense sounds. The audio sensors may be configured to identify specific sounds associated with various activities (e.g., the sound of a bat or golf club hitting a ball, the sound of a bat or golf club swinging, the sound of a punch/kick, the sound of ice skates moving across an ice rink, etc.). The sensor(s) 210 may include machine vision sensors that recognize physical attributes of the environment around the time-synchronized video capture device 200. The sensor(s) 210 may include motion detection sensors that detect specified motions. In some implementations, the sensor(s) 210 include wireless network sensors (Bluetooth sensors, Bluetooth Low Energy sensors, Radio Frequency Identification (RFID) sensors, etc.) that identify the physical positions of an object of a video recording. The sensor(s) 210 may provide sensor data that, as discussed previously, may be used as the basis of time-synchronization triggers. To the extent captured sensor data is incorporated into a multimedia feed, the video capture engine(s) 202 can be characterized as "multimedia capture engine(s)," with a corresponding sensor control engine and media content management engine for each sensor or group of sensors.

In the example of FIG. 2, the video content datastore 212 is intended to represent a datastore configured to store video content captured by the video camera(s) 204. The video content datastore 212 includes a video feed. Depending upon implementation- and/or configuration-specific considerations, the video feed can be augmented with an audio or other type of feed and characterized as a "multimedia feed." The sensor(s) 210 can also have corresponding media storage datastores (not shown) if the sensor(s) 210 have corresponding discrete feeds.

In the example of FIG. 2, the housing 214 is intended to represent a protective housing for the various components of a time-synchronized video capture device. Depending upon implementation- and/or configuration-specific considerations, the housing 214 can be a smartphone housing, a laptop computer housing, or some other device housing for the various components of a time-synchronized video capture device. In a specific implementation, the housing 214 includes an action housing, which is intended to refer to a housing used to protect a camera and/or sensors used in conjunction with a camera, and which facilitates mounting the time-synchronized video capture device in association with a particular activity. An action housing can also be implemented as part of a platform (such as a cavity in which a time synchronized video capture device is received or a mount for a time synchronized video capture device). The action housing can vary depending upon the environment and/or depending upon implementation- and/or configuration-specific considerations.

In an example of operation, a human positions a time synchronized video capture device to face a physical area of interest. (Automated mobile platforms may eliminate the need for a human to position the device.) It may be noted the device may or may not be time-synchronized at the time of deployment, but it will be, which is why it is referred to as time synchronized throughout this example. The field of view management engine 224 provides instructions via the network interface 206 and/or the graphical user interface 208 to adjust the orientation of the time synchronized video capture device and/or provides instructions to the video camera control engine 222 to capture a relevant field of view of a physical area of interest without further human interaction. The video camera control engine 222 receives over the network interface 206 and/or the graphical interface 208 instructions to activate (wake up, begin recording, or the like) the video camera(s) 204; images captured by the video camera(s) 204 are stored in the video content datastore 212. The time synchronization management engine 226, which receives a time synchronization trigger via the network interface 206 and/or the graphical interface 208, detects a time synchronization stimulus associated with the time synchronization trigger from a clock (not shown), the video camera(s) 204, and/or the sensor(s) 210, and provides instructions to the video camera(s) 204 to begin recording and/or informs the video content management engine 228 the stimulus was detected to enable the identification of a start frame for a feed, which may or may not involve preprocessing a feed. The video content management engine 228 instructs the network interface 206 to stream the video content with or without a delay or to transmit the feed in batches from the video content datastore 212.

Example Playback Device

Figure 3:
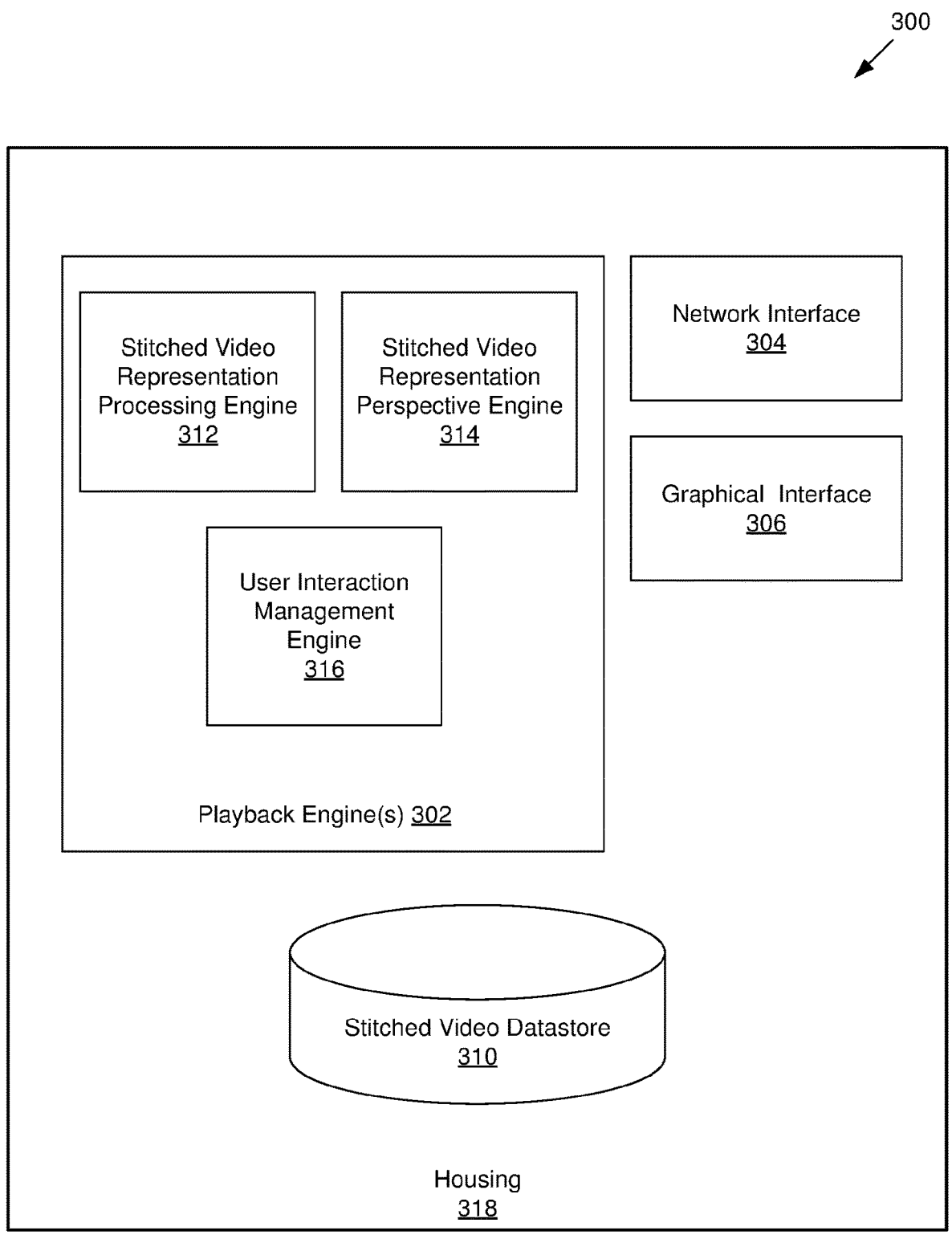
FIG. 3 depicts a diagram of an example of a playback device.

FIG. 3 depicts a diagram 300 of an example of a playback device. The diagram 300 includes playback engine(s) 302, a network interface 304, a graphical interface 306, a stitched video datastore 310, and a housing 318. In the example of FIG. 3, the playback engine(s) 302 include a stitched video representation processing engine 312, a stitched video representation perspective engine 314, and a user interaction management engine 316.

In various implementations, the playback device(s) 110 support a process, an application, a webpage, or the like implemented thereon that facilitates interaction with stitched video representations of the physical area(s) of interest 106.

The stitched video representation processing engine 312 is intended to represent a device that uses one or more automated agents to process stitched video representations of one or more physical areas of interest. In a specific implementation, the stitched video representation processing engine 312 can received over the network interface 304 and display on the graphical interface 306 a stitched video (with or without perspective UI elements that allow a reviewer to select a perspective or a subset of perspectives of a physical area of interest corresponding to fields of view of cameras that captured the applicable video content). Alternatively, the stitched video representation processing engine 312 can receive stitched video via an interface (not shown) other than the network interface 304, such as a USB port, and/or display the stitched video via an interface (not shown) other than or in addition to the graphical user interface 306, such as via a web page.

In a specific implementation, the stitched video representation processing engine 312 provides instructions to the graphical interface 306 to display a stitched video representation of one or more physical areas of interest. For example, the stitched video representation processing engine 312 can communicate with an application displayed on the graphical interface 306 to display a stitched video representation in the application. The stitched video representation processing engine 312 may access one or more Application Programming Interfaces (APIs) supported by the application in order to provide specific images, renderings, etc. to display the stitched video representation on the graphical interface 306.

The stitched video representation perspective engine 314 is intended to represent a device that uses one or more automated agents to facilitate management of a perspective of a stitched video representation displayed on the graphical interface 306. Advantageously, the one or more automated agents can interpret input from a human or agent of the human to display a perspective of the stitched video representation in accordance with the input. For example, the automated agents of the stitched video representation perspective engine 314 can interpret interactions with the graphical interface 306 to provide a desired perspective stitched video representation. To facilitate human interaction, the stitched video representation can include perspective UI elements, such as a graphical "handle" with which to grab a stitched video and spin the stitched video from a first perspective to a second perspective.

In a specific implementation, the automated agents process playback instructions, such as instructions to stop playback, to pause playback, to initiate or continue playback, to rewind playback, and to fast-forward playback. Alternatively or in addition, the automated agents can process instructions to modify a size or an area of a stitched video representation. As examples, the automated agents of the stitched video representation perspective engine 314 may process instructions to zoom, shrink, rotate, resize, or otherwise modify a stitched video representation. Depending upon implementation- and/or configuration-specific considerations, changing perspective can result in a corresponding change to sound offsets or volume or other aspects of a multimedia representation.

The user interaction management engine 316 is intended to represent a device that uses one or more automated agents to receive user interactions from the graphical interface 306 and provides corresponding user interaction instructions to other engines. In a specific implementation, the user interaction management engine 316 implements instructions to control time-synchronized video capture device(s). For example, the user interaction management engine 316 may process instructions to control frames per second (FPS), shutter speeds, active/inactive states, light meters, heights, zooms, rotations, to name several, of time-synchronized video capture device(s). In some implementations, the user interaction management engine 316 allows a reviewer to zoom in and/or focus on a subject in a stitched video representation.

In the example of FIG. 3, the network interface 304 is intended to represent drivers and/or control circuitry for providing data to and sending data from a computer-readable medium. The network interface 304 may comprise a device or port of a playback device. Alternatively or in addition, a playback device can include other interfaces, such as USB ports, multiple network interface types (e.g., WiFi, 4G, Ethernet, etc.), and DVD players, to name a few.

In the example of FIG. 3, the graphical interface 306 is intended to represent drivers and/or control circuitry for receiving user input from and/or displaying content for a reviewer. Alternatively or in addition, a playback device can include other input devices, such as keyboards, mice, and gesture sensors, to name a few, and other display devices, such as peripherals, speakers, and vibrators, to name a few.

In the example of FIG. 3, the stitched video datastore 310 is intended to represent a datastore that stores stitched video data structures associated with one or more physical areas of interest. Depending upon implementation- or configuration-specific factors, the stitched video datastore 310 can rebuffer a stitched video representation when perspective changes, using a stitched video data structure to construct stitched video representations as a function of the present perspective. Alternatively, the stitched video datastore 310 can buffer all possible perspectives, which correspond to the number of feeds used to construct the stitched feed, and switch to the appropriate buffer when a desired perspective changes is implicated via inputs from a reviewer or agent of the reviewer.

In the example of FIG. 3, the housing 318 is intended to represent a protective housing for the various components of a time-synchronized video playback device. Depending upon implementation- and/or configuration-specific considerations, the housing 318 can be a smartphone housing, a laptop computer housing, or some other device housing for the various components of a time-synchronized video playback device.

In an example of operation, the network interface 304 receives one or more stitched video representation data structures. The stitched video representation processing engine 312 stores a stitched video representation in the stitched video datastore 310. The stitched video representation processing engine 312 gathers, based on user instructions received via the graphical interface 306 and processed by the user interaction management engine 316, user instructions to interact with stitched video representations. Commands that correspond to the user interactions are be provided to the stitched video representation processing engine 312, which may instruct the graphical interface 306 to display or modify the display of the stitched video representation. The playback engine(s) 302 operate to display a stitched video representation of one or more physical areas of interest in accordance with the relevant stitched video representation data structure and the relevant instructions via the graphical interface 306.

Example Time-Synchronized Video Capture Management System

Figure 4:
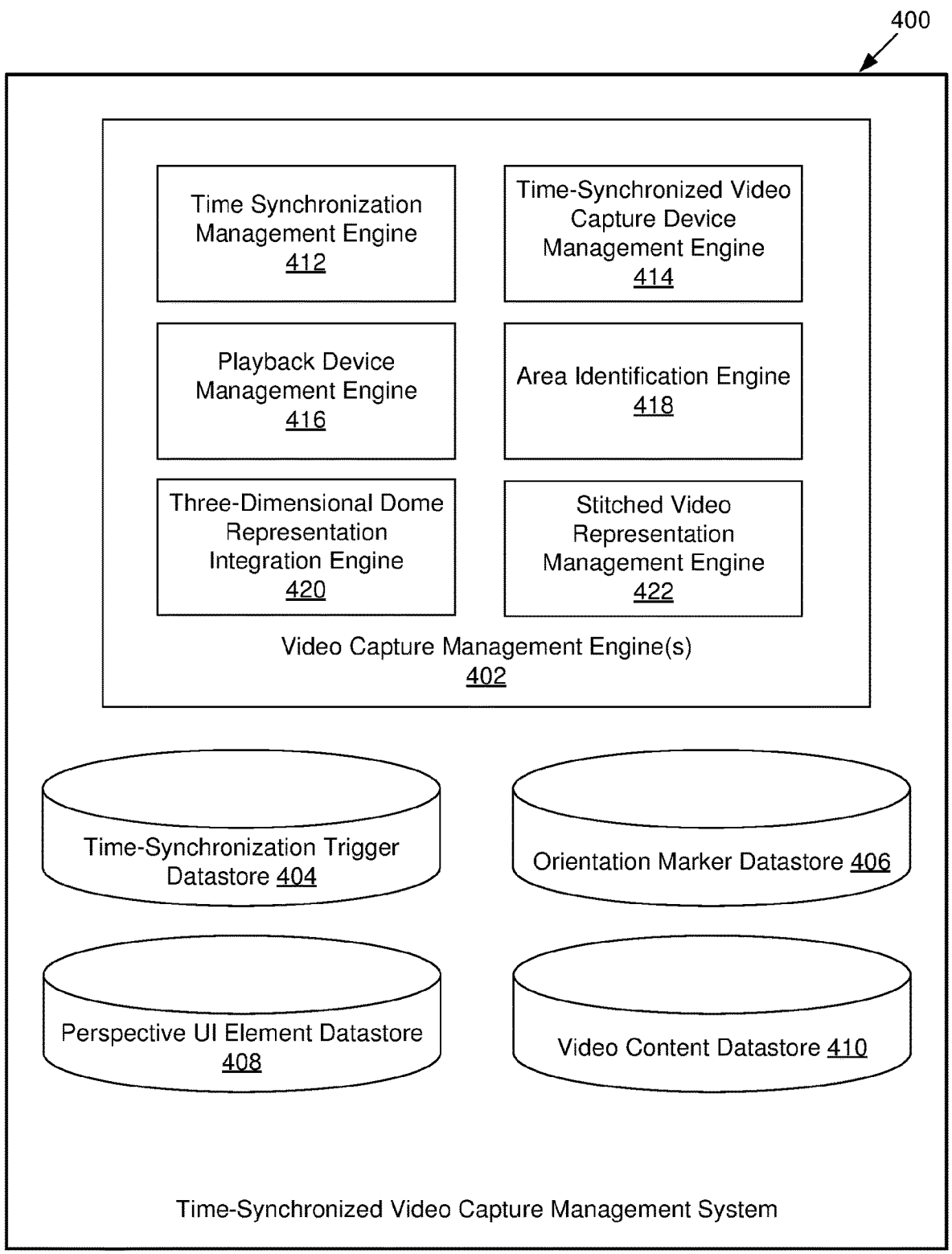
FIG. 4 depicts a diagram of an example of a time-synchronized video capture management system.

FIG. 4 depicts a diagram 400 of an example of a time-synchronized video capture management system. The diagram 400 includes video capture management engine(s) 402, a time-synchronization trigger datastore 404, an orientation marker datastore 406, a perspective UI element datastore 408, and a video content datastore 410. In the example of FIG. 4, the video capture management engine(s) 402 include a time synchronization management engine 412, a time-synchronized video capture device management engine 414, a playback device management engine 416, an area identification engine 418, a three-dimensional dome representation integration engine 420, and a stitched video representation management engine 422. A time-synchronized video capture management system can include other engines and datastores (not shown), such as a metadata datastore that stores metadata of time-synchronized video capture devices (e.g., model name, model number, etc.).

The time synchronization management engine 412 is intended to represent a device that uses one or more automated agents to manage time-synchronization triggers as the basis of video capture of a physical area of interest by time-synchronized video capture devices. For example, the time synchronization management engine 412 may manage one or more specified times and/or one or more specified physical conditions that relate to video capture of a given event/physical area of interest.

In a specific implementation, the time synchronization management engine 412 also uses one or more automated agents to manage one or more specified sounds relevant to an activity that is subject to video capture. Examples of sounds that may be managed include the sound of a bat or golf club hitting a ball, the sound of a bat or golf club swinging, the sound of a punch/kick, the sound of ice skates moving across an ice rink, etc. In various implementations, the time synchronization management engine 412 manages machine vision techniques, such as techniques used to identify specific actions in an activity, that form the basis of time-synchronization triggers. The time synchronization management engine 412 may manage arrangements of specific signals from a device (e.g., a fob, a beacon, etc.) that is associated with a physical position of a subject of a video recording and that is used as the basis of one or more time-synchronization triggers.

The time-synchronized video capture device management engine 414 is intended to represent a device that uses one or more automated agents to manage time-synchronized video capture devices. For example, the time-synchronized video capture device management engine 414 can provide time-synchronized video capture devices with time-synchronization triggers. The time-synchronized video capture device management engine 414 may further provide time-synchronized video capture devices with instructions to control video camera(s) and/or sensors toward a physical area of interest. As examples, the time-synchronized video capture device management engine 414 may provide time-synchronized video capture devices with specific zoom settings, specific orientations toward physical objects, etc. The time-synchronized video capture device management engine 414 may provide time-synchronized video capture devices with time-synchronization triggers and instructions to respond to the time-synchronization triggers. The time-synchronized video capture device management engine 414 may provide instructions to control time-synchronized video capture device(s). For example, the playback device management engine 416 may provide the time-synchronized video capture devices with instructions to capture a specific scene, a specific physical area of interest, or a specific activity.

The playback device management engine 416 is intended to represent a device that uses one or more automated agents to manage playback device(s). For example, the playback device management engine 416 may provide playback device(s) with instructions to set up a specific scene, a specific physical area of interest, or a specific activity. In a specific implementation, the playback device management engine 416 provides playback device(s) with stitched video representations of a physical area of interest. In various implementations, the playback device management engine 416 manages reviewer accounts of reviewers who use playback device(s). The playback device management engine 416 may receive instructions to control time-synchronized video capture device(s). As examples, playback device management engine 416 may receive instructions to control frames per second (FPS), shutter speeds, active/inactive states, light meters, heights, zooms, rotations, etc. of time-synchronized video capture device(s).

The area identification engine 418 is intended to represent a device that uses one or more automated agents to identify one or more physical areas of interest subject to video capture. The time-synchronized video capture device management engine 414 may receive from the area identification engine 418 information about a specific area of interest that is to be subject to video capture. The area identification engine 418 may use geolocational data, information from meshes/contours/etc. and/or other information to identify parameters of a physical area of interest.

The three-dimensional dome representation integration engine 420 is intended to represent a device that uses one or more automated agents to integrate video content of physical area(s) of interest taken from time-synchronized video capture devices into a three-dimensional dome representation of the physical area(s) of interest. The three-dimensional dome representation integration engine 420 may gather video content from the video content datastore 410. In some implementations, the three-dimensional dome representation integration engine 420 identifies one or more orientations of video content relative to the physical area(s) of interest. The three-dimensional dome representation integration engine 420 may mark specific video content with orientation markers obtained from the orientation marker datastore 406. The three-dimensional dome representation integration engine 420 may arrange video content according their orientations relative to physical area(s) of interest. As an example, the three-dimensional dome representation integration engine 420 may project video content onto a map or a projection that arranges the video content therein according to the orientations of the time-synchronized video capture devices that captured that video content.

Depending upon implementation- or configuration-specific factors, the three-dimensional dome representation integration engine 420 may be configured to accommodate different frame rates of video content from different synchronized video capture device(s). As an example, the three-dimensional dome representation integration engine 420 may align frames so that video content captured at 120 FPS is temporally aligned with video content captured at 240 FPS. In some implementations, the three-dimensional dome representation integration engine 420 may match timestamps on frames to ensure that they are aligned in accordance with the video capture. Instead or in addition, the three-dimensional dome representation integration engine 420 may align portions of frames other than timestamps.

The stitched video representation management engine 422 is intended to represent a device that uses one or more automated agents to combine video content into a stitched video representation of physical area(s) of interest. For example, the stitched video representation management engine 422 may use orientation markers as the basis of perspective UI elements on each item of video content such that different perspectives are stitched together into a continuous fabric. In various implementations, the stitched video representation management engine 422 gathers perspective UI elements (boxes, shapes, virtual objects, other UI elements, etc.) from the perspective UI element datastore 408. In conjunction with the three-dimensional dome representation integration engine 420, the stitched video representation management engine 422 can superimpose the perspective UI elements over portions of the three-dimensional dome representation that correspond to orientation(s) of specific video content. The stitched video representation may include the perspective UI elements as portions that intuitively enable a reviewer to change orientation of a video capture of physical area(s) of interest by interacting with the perspective UI elements.

In the example of FIG. 4, the time-synchronization trigger datastore 404 is intended to represent a datastore of time-synchronization triggers, the orientation marker datastore 406 is intended to represent a datastore of orientation markers, the perspective UI element datastore 408 is intended to represent a datastore of perspective UI elements, and the video content datastore 410 is intended to represent a datastore of video content. Omitted from the discussion of FIG. 4 is embodiments that incorporate sound or other components into a video, which was described previously and is applicable here as described.

In an example of operation, the time-synchronized video capture management system creates a stitched video representation of physical area(s) of interest based on video content taken from time-synchronized video capture devices arranged around the physical area(s) of interest. The time synchronization management engine 412 identifies and/or gathers relevant time-synchronization triggers for a specific activity/physical area(s) of interest from the time-synchronization trigger datastore 404. The time synchronization management engine 412 may provide the time-synchronization triggers to time-synchronized video capture devices. The time-synchronized video capture devices may have been set up manually in coordination with automated agents the time-synchronized video capture device management engine 414. Alternatively, where the time-synchronized video capture devices are mounted on a mobile platform, the time-synchronized video capture device management engine 414 can provide instructions to the time-synchronized video capture devices to move to locations appropriate for a given physical area of interest, and to adjust orientations and settings as appropriate, without manual placement. Regardless of whether placement was manual, the time-synchronized video capture device management engine 414 provides the time-synchronized video capture devices with specific configurations/settings/etc. to capture physical area(s) of interest, if necessary to properly capture the physical area(s) of interest. Notably, manual placement with no automated feedback is generally insufficient to properly capture a physical area of interest, though it may be possible to use certain tools (such as levels and range finders) to enable humans to perform the placement task without automated feedback from the time-synchronized video capture device management engine 414. The area identification engine 418 may assist in configuring the time-synchronized video capture devices for a specified physical area of interest. The time-synchronized video capture devices provide video content of the area(s) of interest; and the time-synchronized video capture device management engine 414 stores the video content in the video content datastore 410. Each item of time-synchronized video content may correspond to a field of view (i.e., the field of view of a relevant time-synchronized video capture device) of the physical area(s) of interest. Each field of view may provide a different perspective of the physical area(s) of interest.

In this example of operation, the three-dimensional dome representation integration engine 420 identifies orientations for each field of view. The orientations may be associated with a viewer perspective of each field of view. The three-dimensional dome representation integration engine 420 may further gather orientation markers from the orientation marker datastore 406 and may mark each orientation with an orientation marker. In various implementations, the three-dimensional dome representation integration engine 420 integrates the time-synchronized video content and the orientation markers into a three-dimensional dome representation of the one or more areas of interest. As noted herein, the three-dimensional dome representation may be configured to arrange the time-synchronized video content in accordance with the orientation markers.

In this example of operation, the stitched video representation management engine 422 creates a stitched video representation of the one or more areas of interest using the three-dimensional dome representation. The stitched video representation may be configured to facilitate display of any of the time-synchronized video content at a specific time. As an example, the stitched video representation may be configured to allow a reviewer to view any perspective of the physical area(s) of interest captured by any of the time-synchronized video capture devices at a given time. The stitched video representation, for instance, may allow a reviewer to view a top view of physical area(s) of interest at a given time, and then change to a side view of the physical area(s) of interest at the same time. The stitched video representation management engine 422 may incorporate perspective UI elements to mark various orientations of video content that form the basis of the stitched video representation. For instance, the stitched video representation management engine 422 may incorporate virtual objects (boxes, shapes, etc.) to mark orientations and/or allow reviewers to change perspectives in relation to physical area(s) of interest. The playback device management engine 416 provides the stitched video representation to one or more playback devices for display by those playback devices.

Flowcharts of Example Methods of Operation

Figure 5:
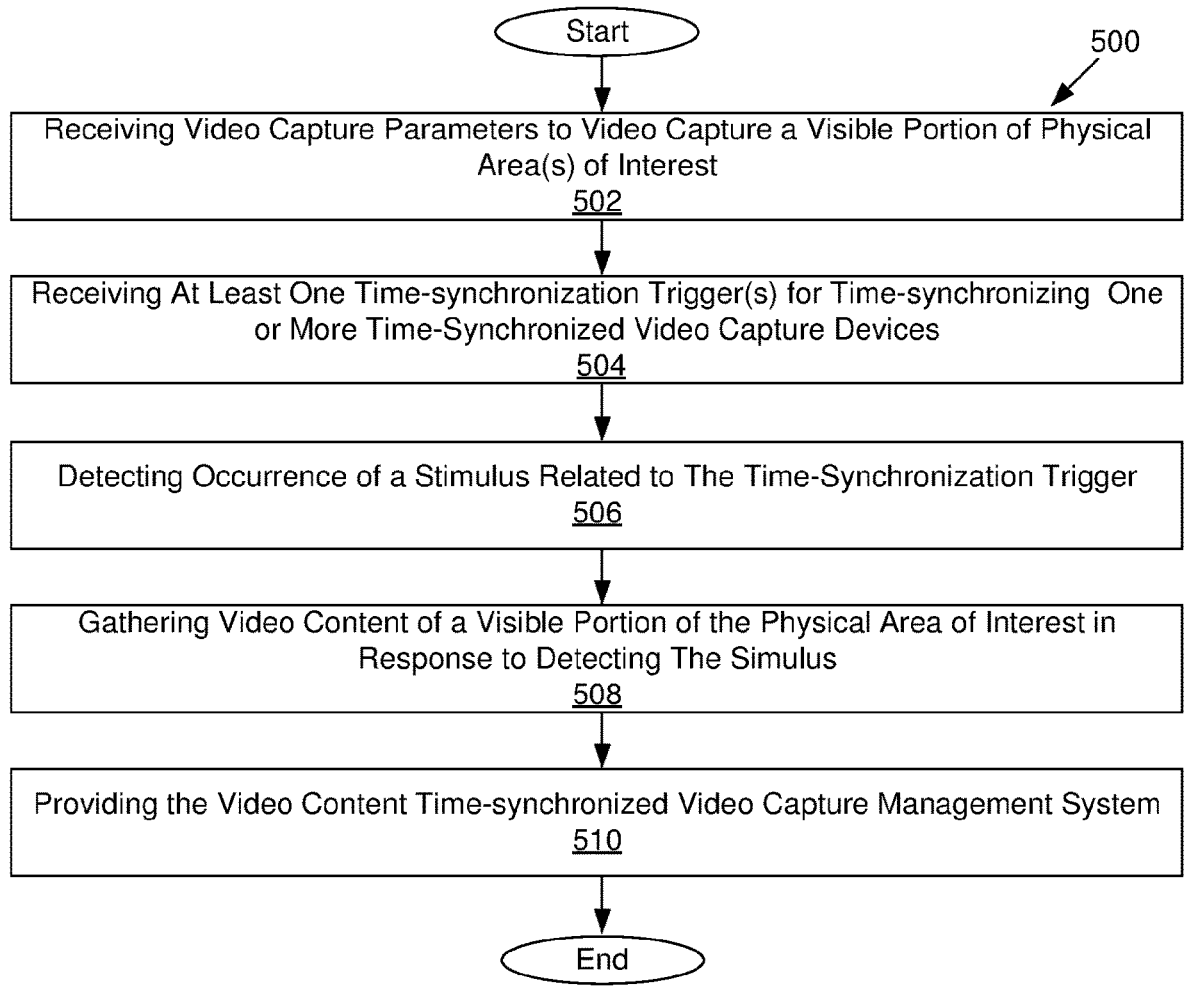
FIG. 5 depicts a flowchart of an example of a method for capturing time-synchronized video content of a visible portion of physical area(s) of interest.

FIG. 5 shows a flowchart 500 of an example of a method for capturing time-synchronized video content of a visible portion of physical area(s) of interest. It is noted the flowchart 500 may include a greater or a lesser number of operations than those explicitly depicted, and that not all operations in the flowchart may be necessary for a specific implementation. The method shown in the flowchart 500 may be carried out by a time-synchronized video capture device.

In the example of FIG. 5, the flowchart 500 starts at module 502 with receiving video capture parameters associated with a physical area of interest. In some implementations, the video capture parameters may comprise FPS, shutter speeds, whether a device is to be in an active or inactive state, whether light meters are to be activated, and other parameters such as heights, zooms, rotations, etc. of the time-synchronized video capture device(s). The purpose of the parameters is to enable a time-synchronized video capture device to configure itself to capture a visible portion of an area of interest in a desired manner. The visible portion may correspond to a field of view of the time-synchronized video capture device. Depending upon implementation- or configuration-specific considerations, the physical area of interest may comprise a single area of interest or a plurality of continuous or discrete areas of interest.

In the example of FIG. 5, the flowchart 500 continues at module 504 with receiving at least one time-synchronization trigger. The time-synchronization trigger may comprise an event, the occurrence of which results in a time-synchronized video capture device initiating video content recording, identifying a starting frame of previously captured video content, initiating buffering of video content, or starting a count-down to when the time-synchronized video capture device will begin buffering video content. In some implementations, the time-synchronization trigger comprises specified times and/or specified physical conditions relating to video capture of a given event.

In the example of FIG. 5, the flowchart 500 continues at module 506 with detecting occurrence of a stimulus related to the time-synchronization trigger. For example, the time synchronization trigger may be based on sound, vision, motion, signals from a device (e.g. a fob or beacon), to name several.

In the example of FIG. 5, the flowchart 500 continues at module 508 with gathering video content of a visible portion of the physical area of interest in response to detecting the stimulus. For example, the time-synchronized video capture device may initiate recording in response to the occurrence of the condition, identify a first frame of previously captured video content, or the like. The video content of the visible portion of the physical area of interest obtained by the time-synchronized video capture device may be time-synchronized in that the starting frame of the relevant video content feed is the same as the starting frame of the relevant video content of another time-synchronized video capture device, but with a different perspective. Advantageously, the use of the time-synchronized video content may allow a stitched video representation of the physical area(s) of interest to be obtained without the use of complex processing steps after the video content has been gathered.

In the example of FIG. 5, the flowchart 500 ends at module 510 with providing the video content to a time-synchronized video capture management system. The video content can be provided as appropriate (e.g., via real time streaming, near real time streaming, in batches, etc.).

Figure 6:
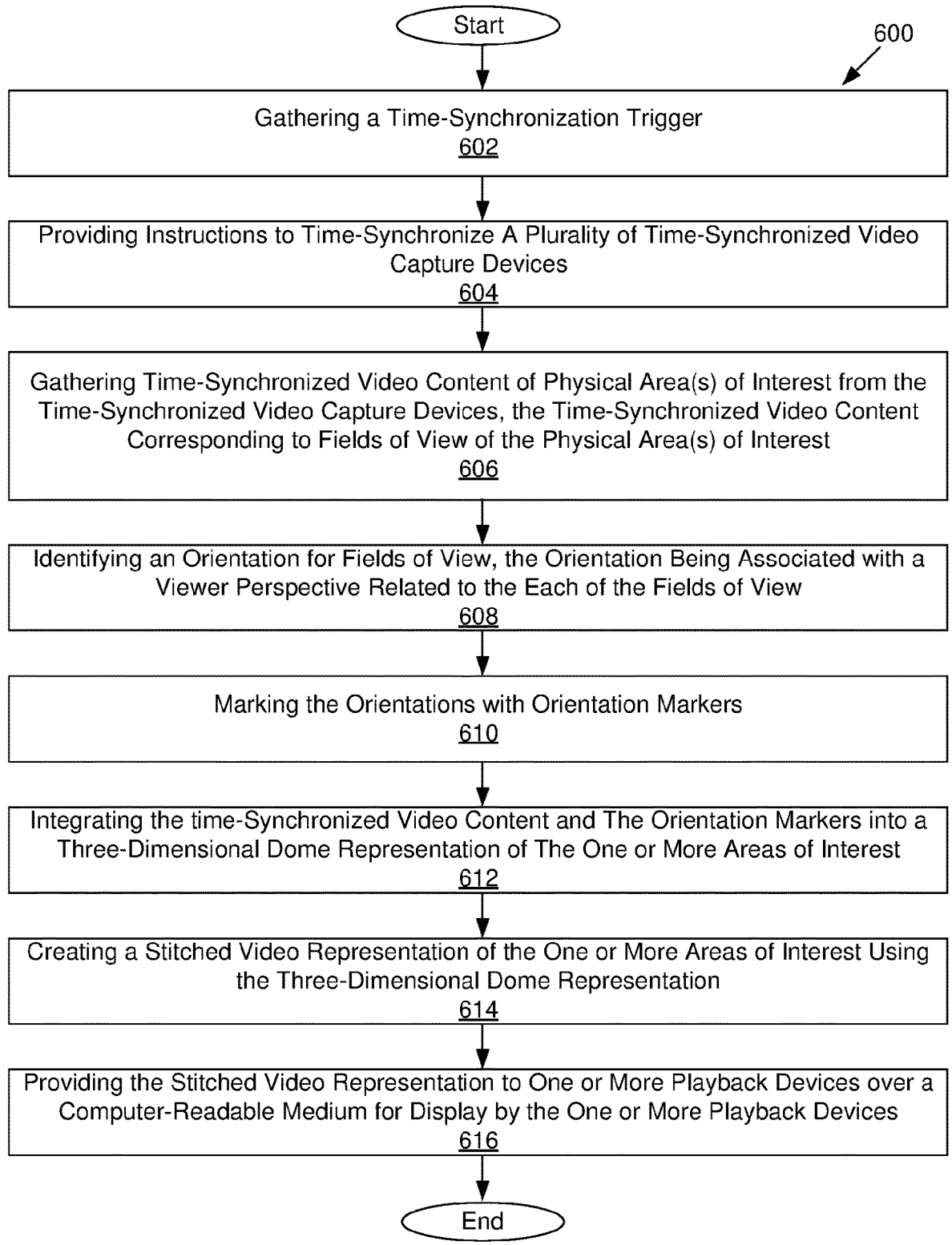
FIG. 6 depicts a flowchart of an example of a method for incorporating video content of a plurality of perspectives of one or more areas of interest into a three-dimensional dome representation of the one or more areas of interest.

FIG. 6 shows a flowchart 600 of an example of a method for creating a stitched video representation of physical area(s) of interest. It is noted the flowchart 600 may include a greater or a lesser number of operations than those explicitly depicted, and that not all operations in the flowchart 600 may be necessary for various implementations. The method shown in the flowchart 600 may be carried out by a time-synchronized video capture management system.

In the example of FIG. 6, the flowchart 600 starts at module 602 with gathering a time-synchronization trigger. The time-synchronization trigger may comprise an event, the occurrence of which results in time-synchronized video capture devices initiating video content recording. In some implementations, the time-synchronization trigger comprises specified times and/or specified physical conditions relating to video capture of a given event. The time synchronization trigger may be based on sounds, images, motion, or signals from a device (e.g., a fob, a beacon, etc.), to name several.

In the example of FIG. 6, the flowchart 600 continues at module 604 with providing instructions to time-synchronize a plurality of time-synchronized video capture devices. The time-synchronization may entail both synchronizing clocks and providing a start time for video feeds at the plurality of time-synchronized video capture devices.

In the example of FIG. 6, the flowchart 600 continues at module 606 with gathering time-synchronized video content of physical area(s) of interest from the time-synchronized video capture devices, the time-synchronized video content corresponding to fields of view of the physical area(s) of interest. The time-synchronized video content may correspond to field(s) of view of the physical area(s) of interest. The time-synchronized video content may be taken by time-synchronized video capture devices oriented at various perspectives relative to the physical area(s) of interest.

In the example of FIG. 6, the flowchart 600 continues at module 608 with identifying an orientation for the fields of view, the orientation being associated with a viewer perspective related to the fields of view. The orientation may be associated with a viewer perspective related to the each of the fields of view. As examples, the orientation may correspond to a view of a specific side or a specific corner of the physical area(s) of interest. The orientation may correspond to a top view, e.g., of the physical area(s) of interest taken from a drone or from a camera mounted onto a stand. The orientation may correspond to various side views or bottom views, e.g., taken from mobile phones, tablet computing devices, or dedicated video cameras mounted onto relevant mounts.

At an operation 610, the orientations may be marked with orientation markers. The orientation markers may comprise data structures that mark an orientation of one of a time-synchronized video capture device. The orientation markers may include information related to the location (global location, relative location relative to the physical area(s) of interest, etc.) of the time-synchronized video capture device. In various implementations, the orientation markers include Cartesian coordinates and/or parameters of an axis orthogonal to a reference point/plane (e.g., a face, a lens, etc.) of the time-synchronized video capture device.

At an operation 612, the time-synchronized video content and the orientation markers may be integrated into a three-dimensional dome representation of the one or more areas of interest. The three-dimensional dome representation may comprise a data structure that represents the cumulative video content captured by multiple time-synchronized video capture devices of the physical area(s) of interest at a specific time. The three-dimensional dome representation may use one or more of the orientation markers to identify orientations of video content at a specific time and/or to identify relationships of video content taken of a common area of interest with respect to one another. In some implementations, the three-dimensional dome representation may accommodate different frame rates of video content from different synchronized video capture device.

At an operation 614, a stitched video representation of the area(s) of interest may be created using the three-dimensional dome representation. The stitched video representation may comprise a video representation of the physical area(s) of interest in which any field of view is visible at a given time. In some implementations, the stitched video representation includes one or more perspective UI elements that mark perspectives associated with each of the field(s) of view. In some implementations, the perspective UI elements comprise floating virtual objects (e.g., floating polygons, floating shapes, floating characters, etc.) that reside over portions of the stitched video representation that correspond to a given perspective. In various implementations, the perspective UI elements allow a reviewer to select perspectives in the stitched video representation at a specific time. A stitched video representation may accommodate different frame rates of video content from different synchronized video capture devices. At an operation 616, the stitched video representation may be provided over a computer-readable medium to one or more playback devices for display by the one or more playback devices.

Figure 7:
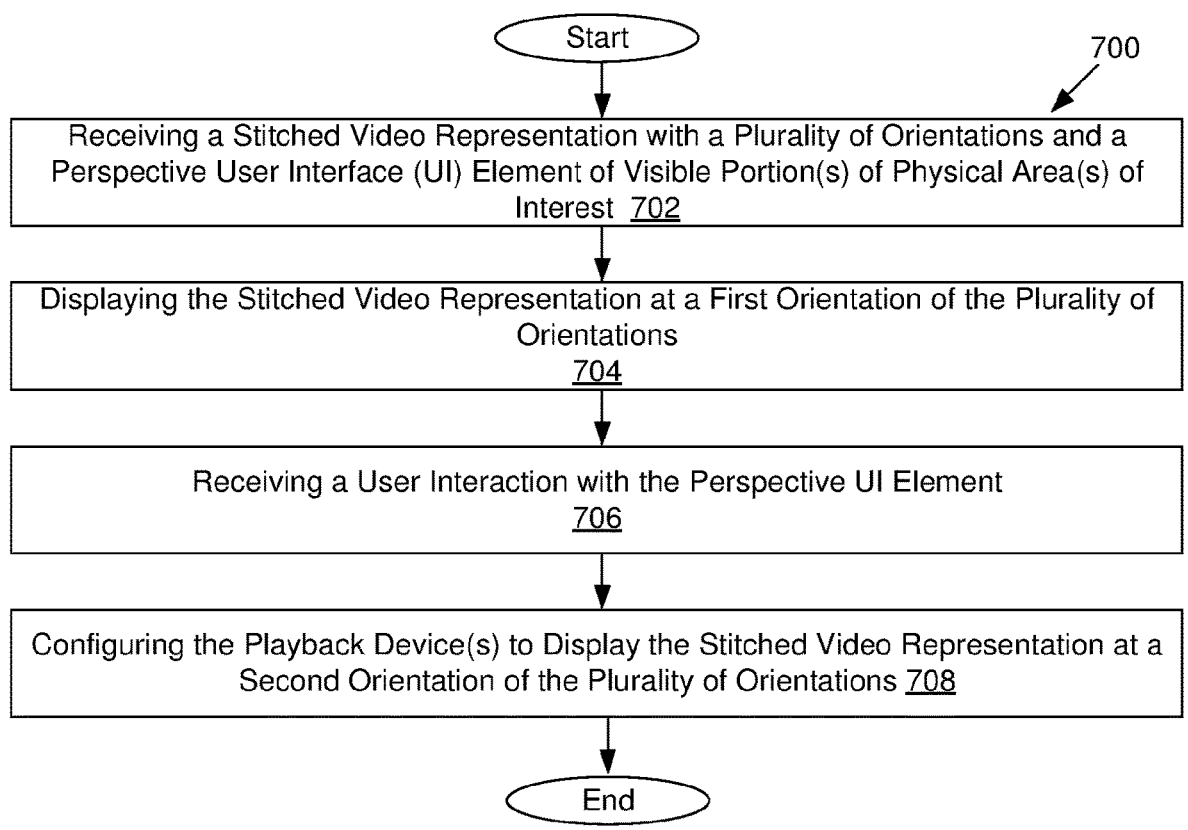
FIG. 7 depicts a flowchart of an example of a method for displaying a stitched video representation of one or more areas of interest on a playback device.

FIG. 7 shows a flowchart 700 of an example of a method for displaying a stitched video representation of one or more areas of interest on a playback device. It is noted the flowchart 700 may include a greater or a lesser number of operations than those explicitly depicted, and that not all operations in the flowchart 700 may be necessary for various implementations. The method shown in the flowchart 700 may be executed by a playback device.

In the example of FIG. 7, the flowchart 700 starts at module 702 with receiving a stitched video representation of physical area(s) of interest over a computer-readable medium. The stitched video representation may include a plurality of orientations and a perspective user interface (UI) element of visible portion(s). The stitched video representation may include one or more perspective UI elements that mark perspectives associated with each of the field(s) of view. In some implementations, the perspective UI elements comprise floating virtual objects (e.g., floating polygons, floating shapes, floating characters, etc.) that reside over portions of the stitched video representation that correspond to a given perspective. In various implementations, the perspective UI elements allow a reviewer to select perspectives in the stitched video representation at a specific time. A stitched video representation may accommodate different frame rates of video content from different time-synchronized video capture device(s). The stitched video representation may be provided to an application on the playback device.

In the example of FIG. 7, the flowchart 700 continues at module 704 with displaying the stitched video representation at a first orientation of the plurality of orientations. The first orientation may correspond to video content taken from a field of view of a time-synchronized video capture device of the physical area(s) of interest. As a result, the first orientation may correspond to video content taken from a first perspective relative to the physical area(s) of interest.

In the example of FIG. 7, the flowchart 700 continues at module 706 with receiving a user interaction with the perspective UI element. As an example, a reviewer's selection of the perspective UI element may be received. The perspective UI element may correspond to a second orientation of the plurality of orientations. At an operation 708, the playback device(s) may be configured to display the stitched video representation at the second orientation of the plurality of orientations.

Examples Screenshots of a Review Application on a Playback Device

Figure 8A:
FIG. 8A shows an example of a screenshot of a review application on a playback device.
Figure 8B:
FIG. 8B shows an example of a screenshot of a review application on a playback device.

FIG. 8A shows an example of a screenshot 800A of a review application on a playback device. The screenshot 800A includes a depiction of a stitched representation of a physical area of interest, which in this example, includes a Mixed Martial Arts (MMA) ring. The screenshot 800A includes a time-synchronized video capture device control button 802 that allows a reviewer to control one or more time-synchronized video capture devices. FIG. 8B shows an example of a screenshot 800B of a review application on a playback device. The screenshot 800B includes a playback speed control button 804 that allows a reviewer to control a playback speed of a stitched video representation of a physical area of interest.

Figure 8C:
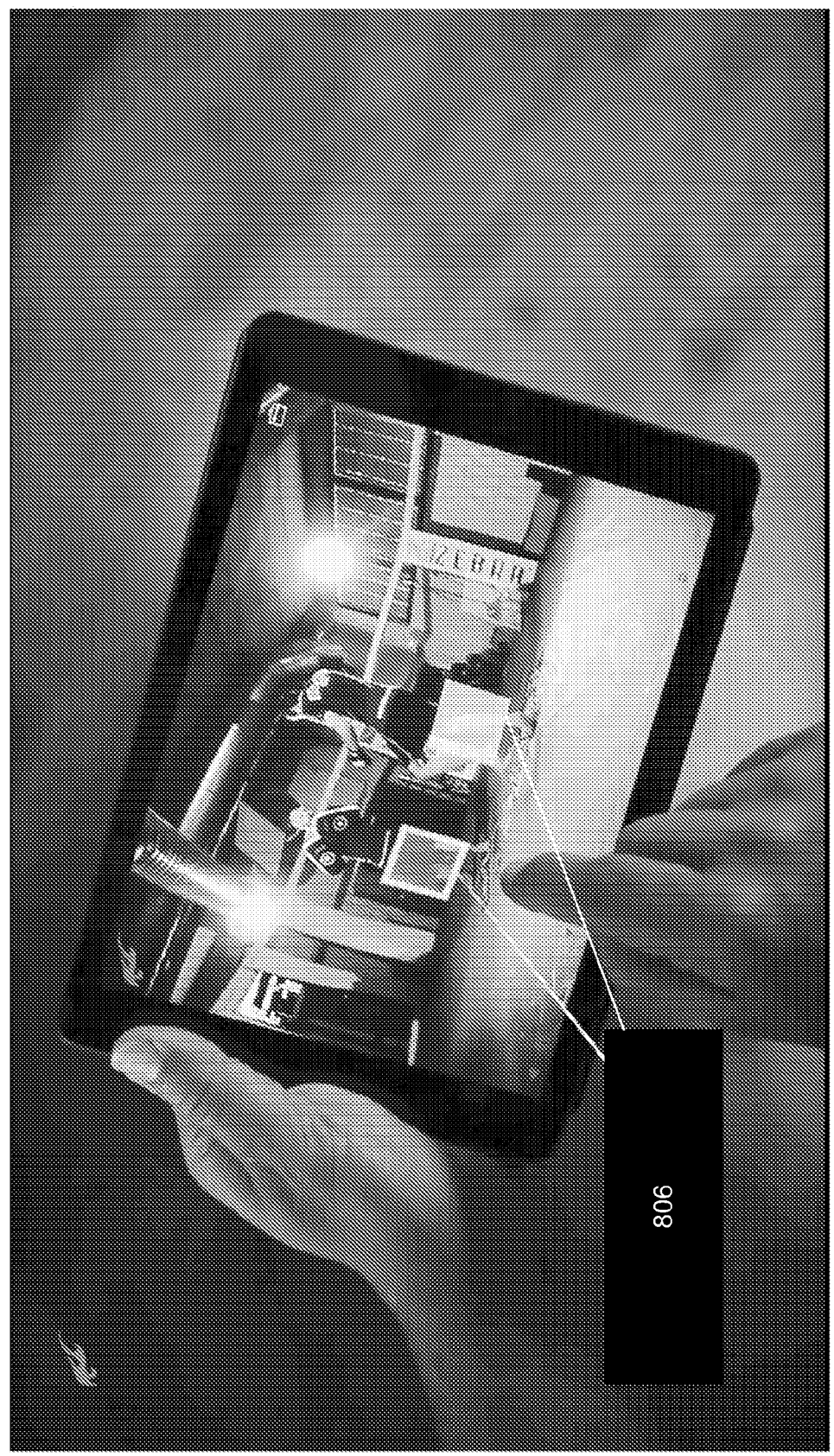
FIG. 8C shows an example of a screenshot of a review application on a playback device.
Figure 8D:
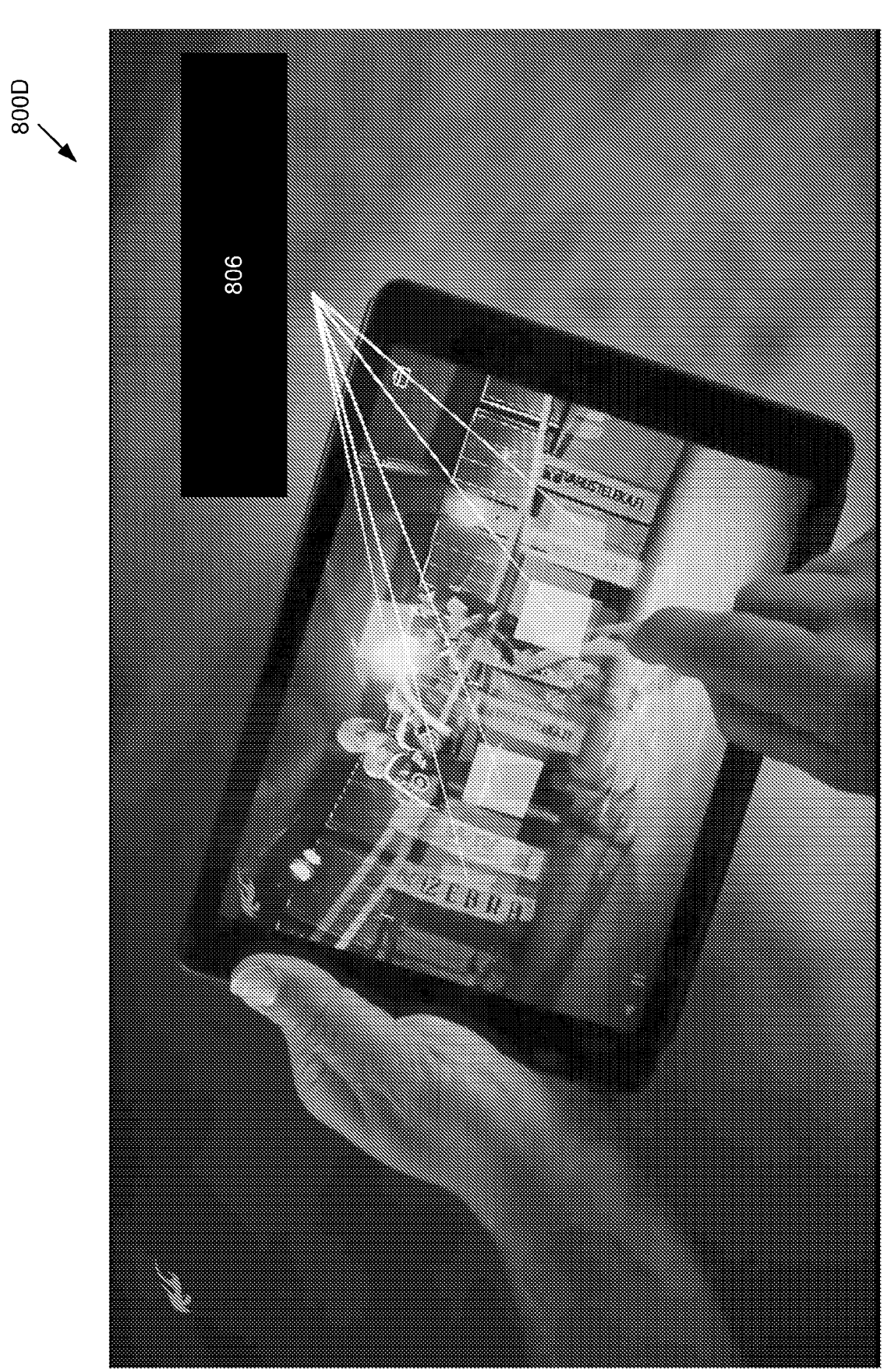
FIG. 8D shows an example of a screenshot of a review application on a playback device.

FIG. 8C shows an example of a screenshot 800C of a review application on a playback device. The screenshot 800C includes a plurality of perspective UI elements 806, shown in the figure as floating squares that float over the depiction of the MMA ring. Each of the perspective UI elements 806 may correspond to a field of view of a time-synchronized video capture device, and of an orientation relative to the MMA ring. In this example, the reviewer may select either of the perspective UI elements 806 to choose a perspective to view the MMA ring. Selecting either of the perspective UI elements 806 may allow the reviewer to see video content from a time-synchronized video capture device that is associated with the perspective UI elements 806. FIG. 8D shows an example of a screenshot 800D of a review application on a playback device. As shown in FIG.

8D, many perspective UI elements 806 may be implemented. Many perspectives/orientations may therefore be accommodated.

Figure 8E:
FIG. 8E shows an example of a screenshot of a review application on a playback device.

FIG. 8E shows an example of a screenshot 800E of a review application on a playback device. In the example of FIG. 8E, a top perspective UI element has been selected; the perspective has switched to a top perspective of the MMA ring. The reviewer may see video content taken from a time-synchronized video capture device positioned above the MMA ring.

Example Computer System

Figure 9:
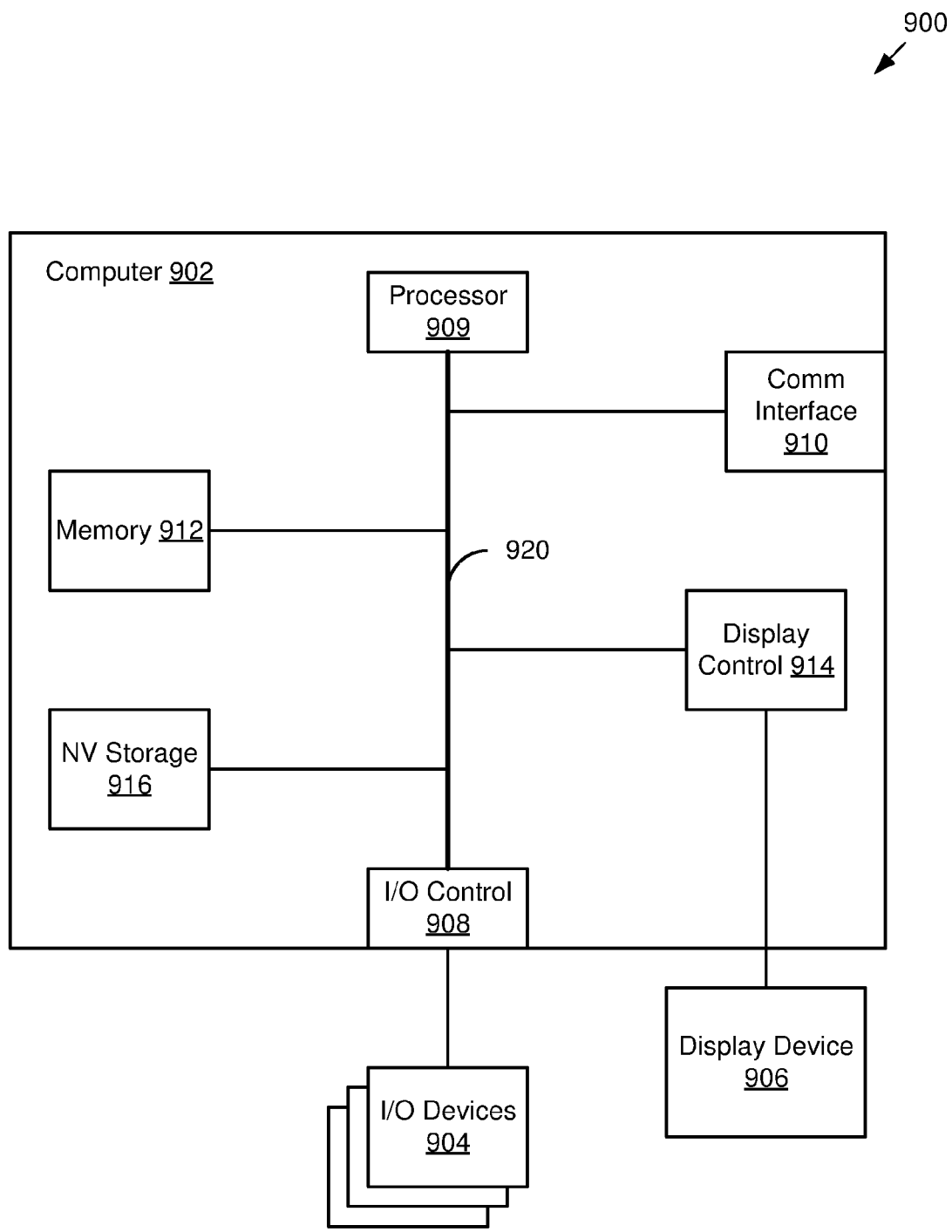
FIG. 9 depicts a diagram of an example of a computer system.

FIG. 9 shows an example of a computer system 900, according to some implementations. The computer system 900 may be a conventional computer system that may be used as a client computer system, such as a wireless client or a workstation, or a server computer system. The computer system 900 includes a computer 902, I/O devices 904, and a display device 906. The computer 902 includes a processor 909, a communications interface 910, memory 912, display controller 914, non-volatile storage 916, and I/O controller 908. The computer 902 may be coupled to or include the I/O devices 904 and display device 906.

The computer 902 interfaces to external systems through the communications interface 910, which may include a modem or network interface. It will be appreciated that the communications interface 910 may be considered to be part of the computer system 900 or a part of the computer 902. The communications interface 910 may be an analog modem, ISDN modem, cable modem, token ring interface, satellite transmission interface (e.g. "direct PC"), or other interfaces for coupling a computer system to other computer systems.

The processor 909 may be, for example, a conventional microprocessor such as an Intel Pentium microprocessor or Motorola power PC microprocessor. The memory 912 is coupled to the processor 909 by a bus 920. The memory 912 may be Dynamic Random Access Memory (DRAM) and may also include Static RAM (SRAM). The bus 920 couples the processor 909 to the memory 912, also to the non-volatile storage 916, to the display controller 914, and to the I/O controller 908.

The I/O devices 904 may include a keyboard, disk drives, printers, a scanner, and other input and output devices, including a mouse or other pointing device. The display controller 914 may control in the conventional manner a display on the display device 906, which may be, for example, a cathode ray tube (CRT) or liquid crystal display (LCD). The display controller 914 and the I/O controller 908 may be implemented with conventional well-known technology.

The non-volatile storage 916 is often a magnetic hard disk, an optical disk, or another form of storage for large amounts of data. Some of this data is often written, by a direct memory access process, into memory 912 during execution of software in the computer 902. One of skill in the art will immediately recognize that the terms "machine-readable medium" or "computer-readable medium" includes any type of storage device that is accessible by the processor 909 and also encompasses a carrier wave that encodes a data signal.

The computer system 900 is one example of many possible computer systems that have different architectures. For example, personal computers based on an Intel microprocessor often have multiple buses, one of which may be an I/O bus for the peripherals and one that directly connects the processor 909 and the memory 912 (often referred to as a memory bus). The buses are connected together through bridge components that perform any necessary translation due to differing bus protocols.

Network computers are another type of computer system that may be used in conjunction with the teachings provided herein. Network computers do not usually include a hard disk or other mass storage, and the executable programs are loaded from a network connection into the memory 912 for execution by the processor 909. A Web TV system, which is known in the art, is also considered to be a computer system, but it may lack some of the features shown in FIG. 9, such as certain input or output devices. A typical computer system will usually include at least a processor, memory, and a bus coupling the memory to the processor.

Though FIG. 9 shows an example of the computer system 900, it is noted that the term "computer system," as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor may be, for example, a general-purpose central processing unit (CPU), such as a microprocessor, or a special-purpose processor, such as a microcontroller.

The memory may include, by way of example but not limitation, random access memory (RAM), such as dynamic RAM (DRAM) and static RAM (SRAM). The memory may be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus may also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage may be local, remote, or distributed. The non-volatile storage is optional because systems may be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used in this paper, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, the computer system 900 may be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus 920 may also couple the processor 909 to the communications interface 910. The communications interface 910 may include one or more input and/or output (I/O) devices. The I/O devices may include, by way of example but not limitation, a keyboard, a mouse or other pointing device, disk drives, printers, a scanner, and other I/O devices, including a display device. The display device 906 may include, by way of example but not limitation, a cathode ray tube (CRT), liquid crystal display (LCD), or some other applicable known or convenient display device. The communications interface 910 may include one or more of a modem or network interface. It will be appreciated that a modem or network interface may be considered to be part of the computer system 900. The communications interface 910 may include an analog modem, ISDN modem, cable modem, token ring interface, satellite transmission interface (e.g. "direct PC"), or other interfaces for coupling the computer system 900 to other computer systems. The communications interfaces 910 may enable computer systems and other devices to be coupled together in a network.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

A detailed description of one or more implementations of the invention is provided in this paper along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus may be specially constructed for the required purposes, or it may comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided. FIG. 9 shows an example of a screenshot of a list of simplified APIs, according to some implementations.

An example of a method developed using techniques described in this paper, and explored by way of example with reference to FIGS. 10-17 includes:

measuring orientation of at least a first, a second and a third camera of the plurality of cameras;

using the measured orientation to determine a direction of view of the at least first, second and third camera of the plurality of cameras;

making a first iteration of the relative positions of the at least first, second and third camera of the plurality of cameras based on the determined direction;

measuring relative distances between the at least first, second and third camera of the plurality of cameras;

making a second iteration of the relative positions of the at least first, second and third camera of the plurality of cameras based on the measured relative distances; and using the first iteration and the second iteration to determine the relative positions of the at least first, second and third camera of the plurality of cameras with respect to each other.

An example of a system developed using techniques described in this paper, and explored by way of example with reference to FIGS. 10-17, includes:

a set of sensors operable to measure orientation of at least a first, a second and a third camera of the plurality of cameras, wherein the sensors of the set of sensors is installed in the at least first, second and third camera of the plurality of cameras; and a server configured to:

determine a direction of view of the at least first, second and third camera of the plurality of cameras using the measured orientation;

make a first iteration of relative positions of the at least first, second and third camera of the plurality of cameras based on the determined direction;

measure relative distances between the at least first, second and third camera of the plurality of cameras;

make a second iteration of relative positions of the at least first, second and third camera of the plurality of cameras based on the measured relative distances; and determine the relative positions of the at least first, second and third camera of the plurality of cameras with respect to each other using the first iteration and the second iteration.

The plurality of cameras are configured to record multiple videos of an object from different directions and positions within a location. Such videos may, for example, be provided to a user on a user device having an application installed therein, which is further operable to provide the user an option for selecting and playing at least one recorded video thereon. Increasing the number of cameras increases the number of views. The number of cameras can be a few cameras (e.g., 3), tens of cameras (e.g., 50), hundreds of cameras (e.g., 500) or even thousands of cameras (e.g., 10,000). In a specific implementation, the cameras are video cameras that can take still images as well. In a specific implementation, the plurality of cameras includes a portable electronic device, such as a smart phone with a camera, a phone with a camera, an iPod, an iPad, a smart camera, such as a digital camera, or the like. In a specific implementation, the cameras comprise sensors of the set of sensors for measuring an orientation of the cameras. The set of sensors can include by way of example but not necessarily by limitation, a magnetometer, gyroscope, and accelerometer.

The plurality of cameras record videos (and/or still images) related to an event taking place within a location. The location can be an open field, an indoor location, or some other location. The event may be a sports event (for example, a basketball match, a badminton match, a baseball match, a football match, a race and the like), theatrical performances (for example opera, dramatics and the like), live performances (for example, musical band performances, dance performance and/or competition, singing performance and/or competition and award presentations), or another applicable venue.

The plurality of cameras can include cameras used for recording (or broadcasting), for example, a sports event. The plurality of cameras can be used, for example, in a training situation, such as professional sports training situation, a yoga instruction training situation, or some other training situation in which visual instruction is useful. As another example, the plurality of cameras may relate to a monitoring purpose of moving objects, such as people within an enclosure, animals within a zoo or nature preserve, or other venues in which monitoring moving objects is useful.

For example, the object can be players involved in the sports event. Similarly, an object can be a participant of a bike race, a skier, a golfer, a baseball player, a gymnast, or participant in some other venue. Thus, the system and method can be useful for bicycle riding training, ski training, golf swing training, baseball batting training, gymnastics training, etc. Further, it may be evident to those skilled in the art that the object should be captured (or recorded) by at least more than one camera (of the plurality of cameras) simultaneously for providing at least more than one view of the object to the user.

In a specific implementation, at least a subplurality of the plurality of cameras are arranged in the location where the event is taking place, such as, in a football stadium for recording videos of the football match. The subplurality of cameras may be configured in the location by attaching the subplurality of cameras to a frame. The frame may be configured to have various shapes (uniform or arbitrary shape) based on a need of a setup. For example, the frame may be configured to have a dome, a sphere, a hemisphere, a cylinder, an oval, a circular, a polygonal, or some other applicable shape. In a specific implementation, the subplurality of cameras is associated with a user (for example, a spectator, a designated camera person, a stadium staff and the like) who is recording videos of the object.

In a specific implementation, cameras comprise a communication medium, a user interface (such as, display, touch screen, buttons), camera optics (for taking still images and recording video), a microphone, a battery, a location means (such as, GPS sensor) for detecting location of the at least first, second and third camera of the plurality of cameras. In a specific implementation, the cameras are communicably coupled to a server via the communication medium, which can be a wired, wireless, or a combination thereof. Examples of the communication medium may include but not be limited to Bluetooth, Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

In a specific implementation, a user device is configured to display video recorded by the plurality of cameras, based on the user selection. According to an embodiment, there may be two user devices, such as a first user device and a second user device. The first user device is associated with a user watching a recorded video and the second user device is associated with an administrator of the system. In an embodiment, the administrator controls displaying of the videos on the first user device. Specifically, the administrator segregates some videos from the recorded videos based on quality, viewer's demand and the like, and presents the segregated videos first user device thereafter. The user device can also be communicably coupled to the server.

In a specific implementation, the server is configured to receive information (i.e. videos or images) from cameras and process thereafter before sending the information to the user device. For example, the server is configured to simultaneously receive all the videos (having different camera views) recorded by the plurality of cameras. The server may be communicably coupled to a datastore for storing the information (i.e. videos or images) received from the plurality of cameras. Alternatively, the datastore may store metadata of each of the plurality of cameras, such as model name, model number and the like. Alternatively, the system could also be established such that no server is needed, i.e. that each camera of the plurality of cameras can perform the function of the server.

In a specific implementation, an application is installed in a user device that is operable for providing the option to the user for selecting and viewing a video from the multiple videos recorded by the plurality of cameras. For example, a user interface of the application may automatically present a mesh of graphical elements, which correspond to the plurality of cameras arranged to record the videos. The user can select a particular graphical element from the mesh of graphical elements for viewing the videos recorded by the camera associated therewith. The automatic presentation of mesh of such graphical elements on the user device is possible when the relative positions of the plurality of cameras with respect to each other are known. For example, the relative positions may be determined based on a calibration method, which is described herein.

In a specific implementation, measuring the orientation of the at least first, second, and third camera of the plurality of cameras is performed by a set of sensors. For example, the set of sensors may be configured to provide orientation information of the at least first, second, and third camera of the plurality of cameras to the server. In an embodiment, the orientation information comprises data about position of the at least first, second, and third camera of the plurality of cameras with respect to a reference plane. Further, the orientation information comprises angles at which the plurality of cameras is arranged with respect to X axis of a coordinate system. For example, the orientation information includes values of angle alpha ($\alpha$) (formed with respect to X axis), and angle beta ($\beta$) (formed between a surface defined by X and Y axis).

In a specific implementation, the orientation information is measured based on visual analysis. In another implementation, the location means (such as, GPS sensor) installed in the at least first, second, and third camera of the plurality of cameras may detect location of the at least first, second and third camera of the plurality of cameras. In another implementation, the magnetometer behaves as magnetic compass and is operable to find an orientation (or a likely/approximate position) of each of the plurality of cameras, with respect to magnetic field of the location. In another implementation, the gyroscope is operable to find an orientation of each of the plurality of cameras based on earth's gravity and the accelerometer is operable to measure non-gravitational acceleration. Thereafter, a direction of view of the at least first, second, and third camera of the plurality of cameras is determined using the measured orientation. For example, the server, which is communicably coupled to the plurality of cameras, is configured to receive the orientation information from the set of sensors (installed in the plurality of cameras) and determine the direction of view of the at least first, second, and third camera of the plurality of cameras thereafter.

Alternatively, the direction of view of the at least first, second and third of the plurality of cameras is determined using the measured orientation and/or information associated with a defined geometrical shape of the location where the plurality of cameras is arranged. In such instance, the database of the server has pre-stored information associated with the geometrical shape of the location. In an example, dimensions of the location (such as, a badminton court of cuboidal shape, having a length of 200 meters, a width of 100 meters and a height 150 meters) may be stored therein. Similarly, dimensions of the location (such as, a track field of a sphere or a quasi-sphere shape having a radius of 100 meters) may also be stored therein. The first iteration of the relative positions of the at least first, second and third camera of the plurality of cameras is made thereafter based on the determined direction of view. Specifically, the server uses the determined direction as a first approximation to find the relative positions of the at least first, second and third camera of the plurality of cameras, i.e. to determine a likely position of the plurality of cameras assuming that these are equidistant from the object. Further, the first iteration is based on assuming the orientation of the at least first, second and third camera of the plurality of cameras is towards an object.

In a specific implementation, a server is operable to make the first iteration of the relative positions of the at least first, second, and third camera of the plurality of cameras based on calculating the position by looking on a value in respect to a common co-ordinate base of the plurality of cameras and the orientation information (such as, information measured by magnetometer, using a magnetic compass). Typically, the magnetic compass has a measuring circle where 0 degree corresponds to North, 90 degrees correspond to East, 180 degrees correspond to South and 270 degrees correspond to West. In an example, if the first camera is aiming to direction $\alpha$=270 degrees, based on the assumption that the orientation of the at least first, second and third camera is towards an object, thus its position around the object is in $\alpha$ 180=90 degrees.

Relative distances between the at least first, second, and third camera of the plurality of cameras can be measured thereafter. For example, the relative distances between the plurality of cameras are measured by the server. In an embodiment, as the first iteration of the relative positions of the at least first, second and third of the plurality of cameras is made based on an assumption that each of the plurality of cameras point towards the object, and may not always yield correct results. For example, if the cameras are arranged in a way that the second camera and the third camera of the plurality of cameras point in a direction away from the object, then in such instance, the first iteration of the relative positions of the at least first, second and third camera of the plurality of cameras will not hold good. Also, if the cameras are arranged adjacent to each other (for example, on a rectangular track) and in a way that the second and the third cameras point in a same direction, then in such instance, the second and the third cameras could not be distinguished and only the determined directional information would not provide sufficient information to order these cameras since these point to the same direction. This may be addressed by measuring the relative distances between the at least first, second and third camera of the plurality of cameras.

In an embodiment, the measured relative distances may be based on calculating received signal strength indicator (RSSI) values between the at least first, second and third camera of the plurality of cameras. Specifically, each of the plurality of cameras may be configured to send and receive radio waves using the communication medium, such as Bluetooth (BT) of each of the plurality of cameras. For example, the first camera is configured to send pings over Bluetooth and the second and the third cameras are configured to receive the pings and measure RSSI thereof. Similarly, the second camera is configured to send pings over Bluetooth and the first and the third cameras are configured to receive the pings and measure RSSI thereof. Similarly, the third camera is configured to send pings over Bluetooth and the first and the second cameras are configured to receive the pings and measure RSSI thereof. Additionally or alternatively the relative distance between cameras can be determined with Global Positioning System (GPS). Additionally or alternatively the relative distance between cameras can be determined with voice. In this alternative embodiment one or more of the cameras make a sound and other cameras (the recording cameras) record the sound. The arrival time of the sound to the recording camera is used to determine the relative position of the cameras. The recording cameras may additionally use the moment of sending, i.e. the time of travel of the voice, as well as optionally a triangulation technique with other recording cameras to determine their relative positions. Additionally or alternatively other radio technologies than BT can be used, such as (but not limited to) Wireless Local Area Network, low power BT etc.

The second iteration of the relative positions of the at least first, second, and third camera of the plurality of cameras is made thereafter, based on the measured relative distances. The second iteration of the relative positions is based on comparing the measured relative distances to theoretical distance between the at least first, second and third camera of the plurality of cameras. For example, the second iteration of the relative positions may be based on dividing the measured relative distances and the theoretical distance between the at least first, second and third camera of the plurality of cameras. In an embodiment, the theoretical distance defines a geometrical shape of the location for example, circular, rectangular and the like. Further, the relative positions of the at least first, second, and third camera of the plurality of cameras with respect to each other are determined using the first iteration and the second iteration.

In an example, if distances between the relative positions of each of the at least first, second, and third camera of the plurality of cameras (after the second iteration) comes out to be substantially same (within error margins), then the orientation information and the relative positions of each of the plurality of cameras is right. Otherwise, a user (such as, an administrator or a user associated with a camera of the plurality of cameras) is instructed to correct position of the at least first, second and third camera of the plurality of cameras.

In a specific implementation, determined relative positions of a first, second, and third camera of the plurality of cameras is shown in a user device. If a user is not satisfied with the positions, then graphical elements can be dragged and dropped to appropriate relative positions using the user interface of the user device. Alternatively, if the user agrees with the positions, then the videos of the object can be recorded using the plurality of cameras thereafter. For example, the user sends a start recording command substantially simultaneously to each of the plurality of cameras and thereafter receives recorded videos (or in real time receives and stores the streamed videos from the plurality of cameras). In a specific implementation, each of the plurality of cameras comprises an application installed therein which is operable to start recording (and storing or streaming content to target device/server) the video substantially at the same time as other cameras. In a specific implementation, a server has a file or a set of files for reproducing videos from multiple angles.

In a specific implementation, if a user starts a new recording session and wants to position the plurality of cameras the way the cameras were positioned earlier, the user loads the earlier used camera configuration for reference and the user interface indicates the current camera positions. The user can now physically move the cameras to correct positions to match with the earlier used configuration. The user interface may be configured to display indicators that show when each camera position matches with the earlier used position.

Figure 10:
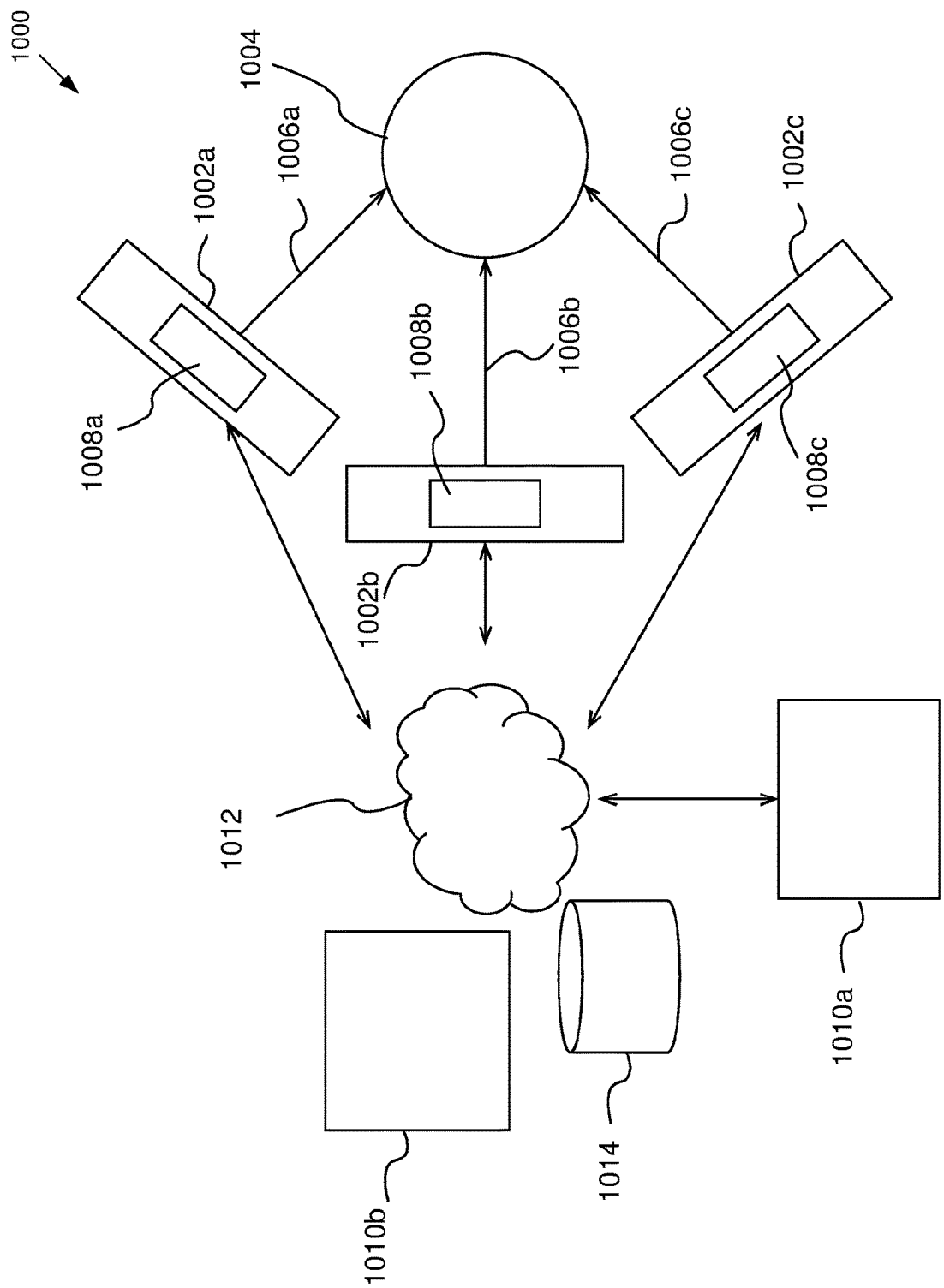
FIG. 10 is a schematic illustration of an environment.

Referring to FIG. 10, illustrated is a schematic illustration of an environment 1000. The environment 1000 includes cameras 1002a, 1002b and 1002c (hereinafter collectively referred to as the plurality of cameras 1002). The plurality of cameras 1002 are arranged in such a way that the plurality of cameras 1002 hemispherically surrounds an object 1004 for recording videos of the object 1004. Specifically, the cameras 1002a, 1002b and 1002c point to directions 1006a, 1006b and 1006c (hereinafter collectively referred to as directions 1006) respectively for recording the videos of the object 1004. Each of the plurality of cameras 1002 is associated with a respective direction, i.e. each of the plurality of cameras 1002 has a particular direction of view, which enables each of the plurality of cameras 1002 to record videos of the object 1004 from a certain angle and direction. The directions 1006 are determined based on orientation information of the cameras 1002a, 1002b and 1002c, measured by orientation sensors (1008a, 1008b and 1008c) respectively, installed therein, described in detail with reference to, for example, FIG. 15 and FIG. 16.

FIG. 10 is intended to illustrate that each of the plurality of cameras 1002 is communicably coupled to a plurality of user devices 1010a and 1010b (hereinafter collectively referred to as plurality of user devices 1010) via a communication medium 1012. For example, each of the plurality of cameras 1002 can host an application, which is configured to connect each of the plurality of cameras 1002 to each of the plurality of user devices 1010 via the communication medium 1012.

FIG. 10 is intended to illustrate a server 1014 that is communicably coupled to each of the plurality of cameras 1002 and each of the plurality of user devices 1010 via the communication medium 1012. The videos of the object 1004 recorded by each of the plurality of cameras 1002 may be stored in a datastore (not shown), which is communicably coupled to the server 1014 along with other related metadata of each of the plurality of cameras 1002.

In a specific implementation, the server 1014 is operable to process the received videos from the plurality of cameras 1002 and further configured to send the processed videos to the plurality of user devices 1010. A user interface (not shown) of each of the plurality of user devices 1010 is configured to enable a user to change direction of view of the plurality of cameras 1002 depending upon the video received from the plurality of cameras 1002. The direction of view (or recording directions i.e. corresponding viewing positions) of the plurality of cameras 1002 can be changed based on determined directions (described in subsequent figures).

The plurality of user devices 1010 is configured to remotely control the plurality of cameras 1002. For example, the user interface of each of the plurality of user devices 1010 can be configured to remotely control the plurality of cameras 1002, e.g., by sending commands to start/stop recording or streaming image/video of the object 1004.

Figure 11:
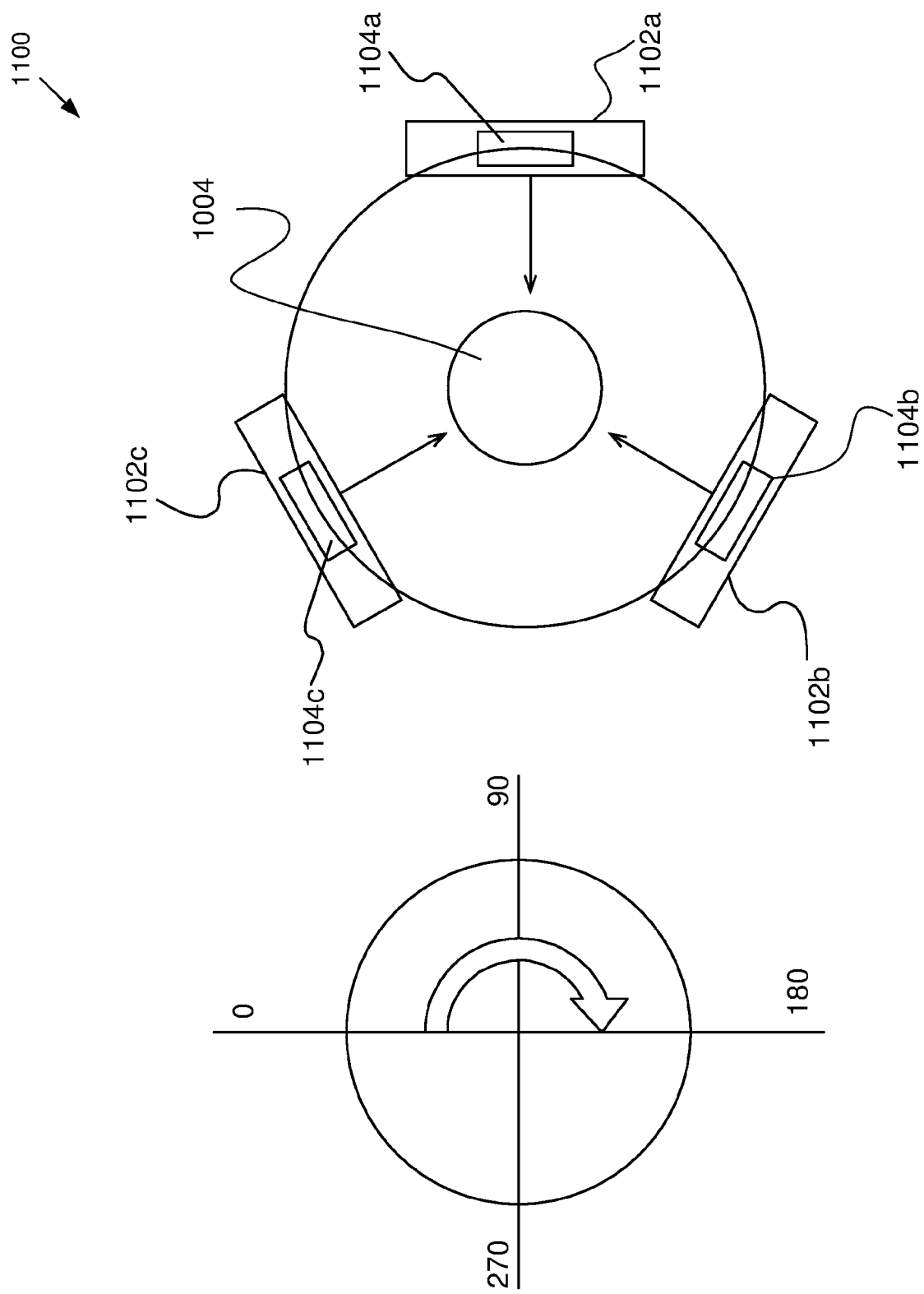
FIG. 11 is an example illustration depicting orientation arrangements of a plurality of cameras around an object.
Figure 12:
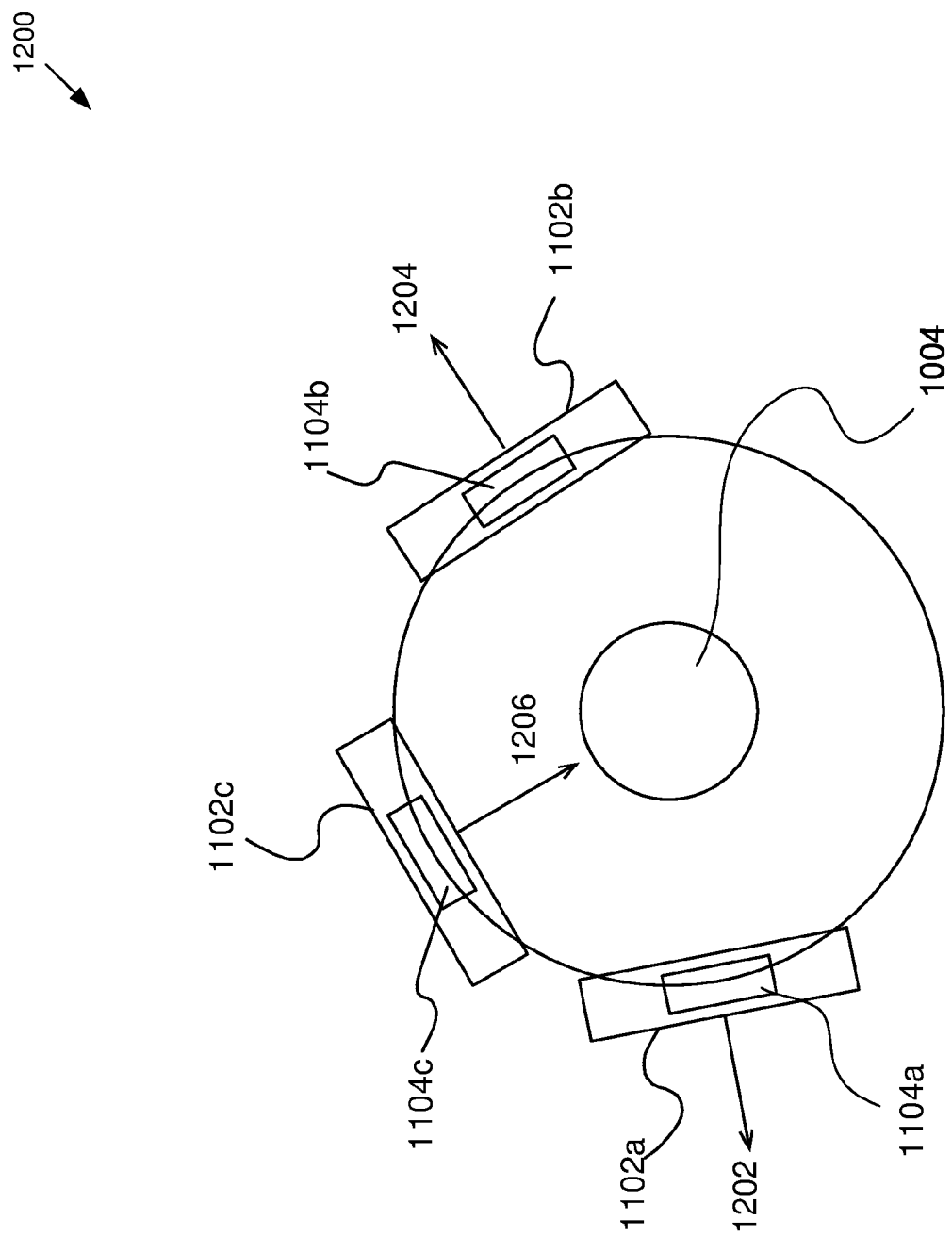
FIG. 12 is an example illustration depicting orientation arrangements of a plurality of cameras around an object.

Referring to FIGS. 11-12, illustrated are example illustrations depicting orientation arrangements, such as orientation arrangements 1100 and 1200, respectively, of the plurality of cameras 1002 around the object 1004.

As shown in FIG. 11, cameras 1102a, 1102b and 1102c are arranged around the object 1004 in a circular fashion forming the orientation arrangement 1100. The cameras 1102a, 1102b and 1102c have orientation sensors 1104a, 1104b and 1104c respectively, installed therein.

The orientation sensors 1104a, 1104b and 1104c are configured to measure orientation data of the cameras 1102a, 1102b and 1102c respectively and further configured to send the measured orientation data to the server 1014 (shown in FIG. 10). Specifically, the server 1014 is configured to process the orientation data of the cameras 1102a, 1102b and 1102c and further configured to determine a direction of view of the cameras 1102a, 1102b and 1102c using the measured orientation, described in detail in FIGS. 15 and 16. The server 1014 is further operable to make a first iteration of the relative positions of the cameras 1102a, 1102b and 1102c based on the determined direction, assuming that the cameras 1102a, 1102b and 1102c are placed at equal distance from the object 1004.

Specifically, the server 1014 is configured to determine the likely positions of the cameras 1102a, 1102b and 1102c by considering value in respect to a common co-ordinate base of the cameras 1102a, 1102b and 1102c. For example, the camera 1102a has a direction, $\alpha=270$ degrees, thus its position around the object 1004 is estimated to be $\alpha-180=90$ degrees. Further, this estimation determines a relative position of the cameras 1102a, 1102b and 1102c.

As shown in FIG. 12, the cameras 1102a, 1102b and 1102c are arranged around the object 1004 in a circular fashion forming the orientation arrangement 1200. Specifically, the orientation arrangement 1200 includes the cameras 1102a, 1102b and 1102c having sensors 1104a, 1104b and 1104c, respectively, and arranged in a counter clockwise manner. Further, the cameras 1102a, 1102b and 1102c are arranged in a way that the direction of views are determined by the sensors 1104a, 1104b and 1104c, and shown as directions 1202, 1204 and 1206 respectively. In such instance, the server 1014 is configured to measure relative distances between the cameras 1102a, 1102b and 1102c and further configured to make a second iteration of the relative positions of the cameras 1102a, 1102b and 1102c based on the measured relative distances, which is described in detail in FIG. 13.

Figure 13:
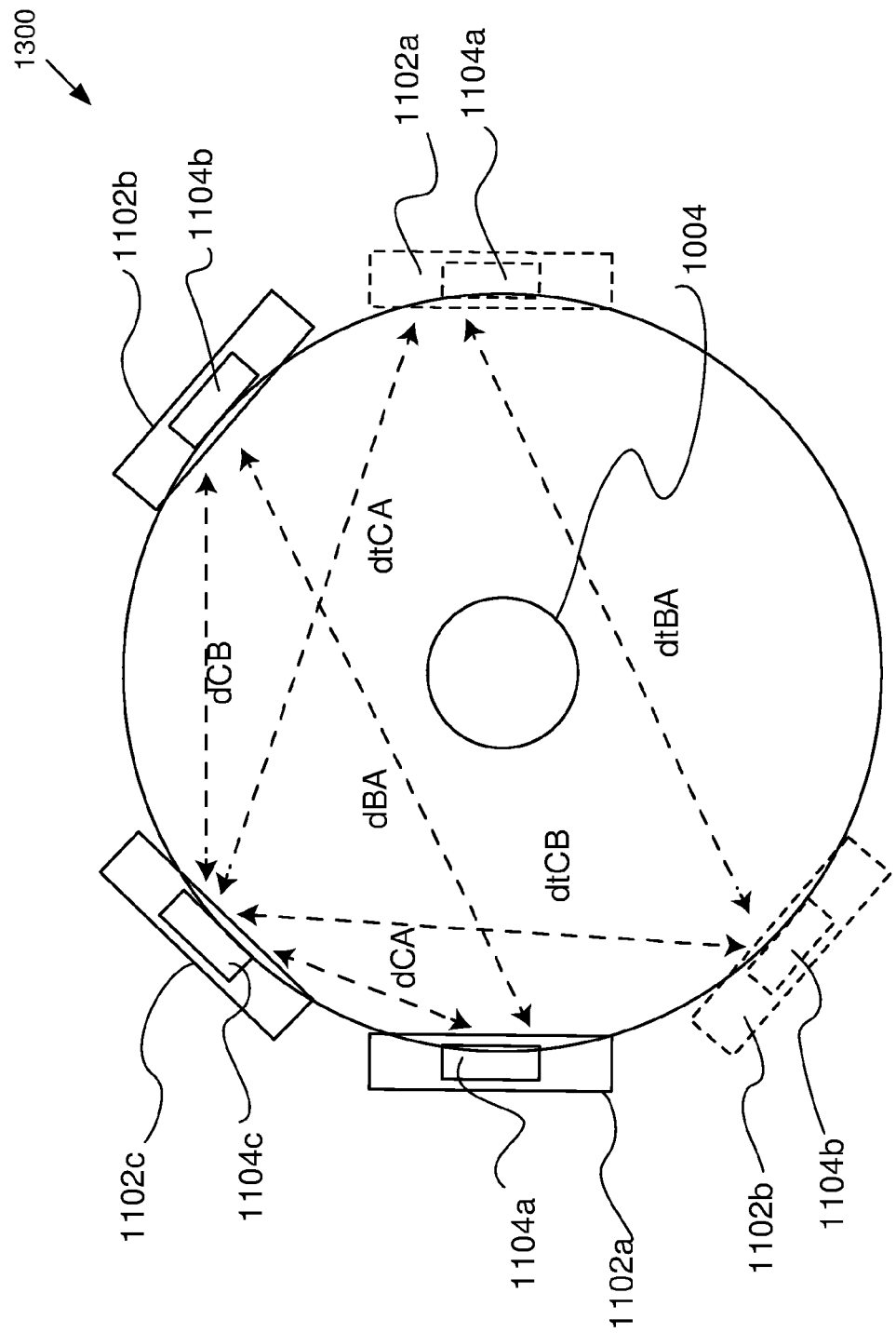
FIG. 13 is an example illustration for determining relative positions of the plurality of cameras having the orientation arrangements of FIGS. 2-3.

Referring now to FIG. 13, illustrated is an example illustration of an arrangement 1300 depicting positions of the cameras 1102a, 1102b and 1102c illustrated in the orientation arrangements 1100 and 1200. FIG. 13 illustrates measurement of relative distances between the cameras 1102a, 1102b and 1102c with respect to each other. Specifically, the relative distances are measured based on calculating received signal strength indicator values between the cameras 1102a, 1102b and 1102c. As shown, the relative distances between the cameras 1102a, 1102b and 1102c are dAB, dAC and dBC.

Further, the second iteration of the relative positions of the cameras 1102a, 1102b and 1102c is made based on the measured relative distances. Specifically, the second iteration of the relative positions is based on comparing the measured relative distances and a theoretical distance between the cameras 1102a, 1102b and 1102c. As shown, the theoretical distance between the cameras 1102a, 1102b and 1102c are dtAB, dtAC and dtBC. More specifically, the second iteration of the relative positions is based on dividing the measured relative distances and the theoretical distance between the cameras 1102a, 1102b and 1102c, illustrated below as:

rAB=dAB/dtAB,
rAC=dAC/dtAC,
rBC=dBC/dtBC.

The values rAB, rAC and rBC are the relative positions of the cameras with respect to each other. If distances between the relative positions of the cameras 1102a, 1102b and 1102c (after the second iteration) come out to be substantially same, then the orientation information and the relative positions of the cameras 1102a, 1102b and 1102c are right. Otherwise, a user (such as, an administrator or a user associated with a camera of the cameras 1102a, 1102b and 1102c) may be instructed to correct position of the cameras 1102a, 1102b and 1102c.

Figure 14:
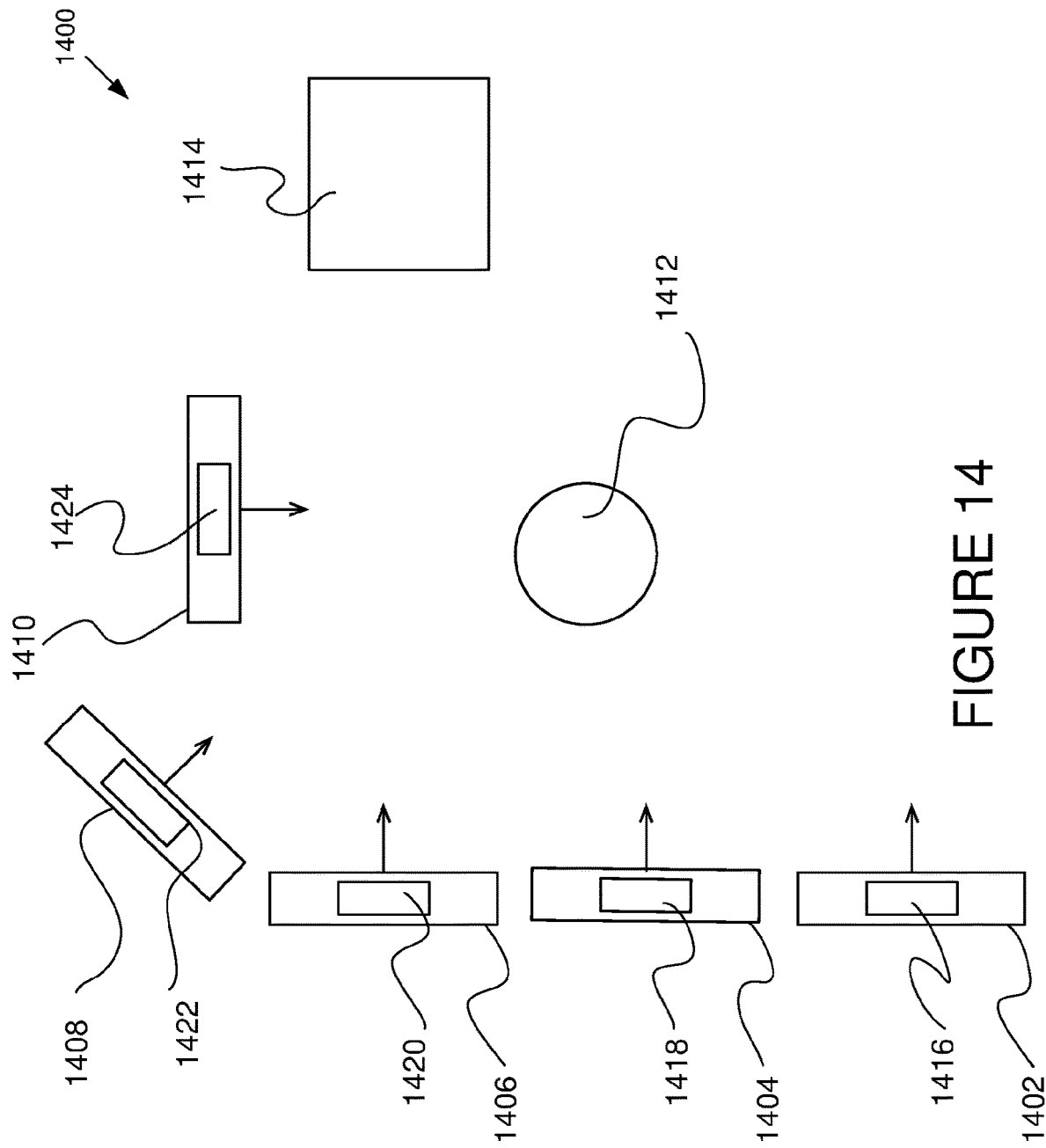
FIG. 14 is an example illustration for determining relative positions of a plurality of cameras and order thereof.

Referring now to FIG. 14, illustrated is an example illustration 1400 for determining relative positions of a plurality of cameras, such as cameras 1402, 1404, 1406, 1408 and 1410 with respect to each other. As shown, the cameras 1402, 1404, 1406, 1408 and 1410 are arranged around an object 1412 (unlike circular manner, as shown in FIG. 13). Each of the cameras 1402, 1404, 1406, 1408 and 1410 is communicably coupled to a user device 1414 via the communication medium 1012 (as shown in FIG. 10). Specifically, each of the cameras 1402, 1404, 1406, 1408 and 1410 hosts an application, which is configured to connect each of the cameras 1402, 1404, 1406, 1408 and 1410 to the user device 1414 via the communication medium 1012 (shown in FIG. 10).

Further, each of the cameras 1402, 1404, 1406, 1408 and 1410 has orientation sensors 1416, 1418, 1420, 1422 and 1424, respectively, installed therein. Each of the orientation sensors 1416, 1418, 1420, 1422 and 1424 are configured to measure an orientation data of the cameras 1402, 1404, 1406, 1408 and 1410, respectively, and further configured to communicate the measured orientation data to the user device 1414. The server 1014 (as shown in FIG. 10) or the user device 1414 is configured to use the orientation data to determine direction of view of each of the cameras 1402, 1404, 1406, 1408 and 1410 from where the cameras 1402, 1404, 1406, 1408 and 1410 are recording videos of the object 1412. As shown, based on the determined direction of views, it is clear that the cameras 1402, 1404 and 1406 point in a same direction and can distinguish between the cameras 1402, 1404 and 1406, and the cameras 1408 and 1410.

Further, the server 1014 (as shown in FIG. 10) or the user device 1414 is configured to determine the relative positions of the cameras 1402, 1404, 1406, 1408 and 1410 with respect to each other based on calculating the received signal strength indicator values between each of the cameras 1402, 1404, 1406, 1408 and 1410 (and optionally between the cameras 1402, 1404, 1406, 1408 and 1410 and the user device 1414). In an instance, the relative distance between the cameras 1402 and 1410 is greater than the relative distance between the cameras 1404 and 1410, which is further greater than the relative distance between the cameras 1406 and 1410. This enables the server 1014 (as shown in FIG. 10) or the user device 1414 to determine an order in which the cameras 1402, 1404, 1406, 1408 and 1410 are arranged.

Moreover, the user device 1414 is configured to display the determined relative positions of the cameras 1402, 1404, 1406, 1408 and 1410 with respect to each other to a user. A user interface (not shown) of the user device 1414 comprises a mesh of graphical elements, corresponding to each of the cameras 1402, 1404, 1406, 1408 and 1410, which allows the user to change the relative positions of the cameras 1402, 1404, 1406, 1408 and 1410 (if needed) by dragging and dropping the graphical elements to appropriate/desired relative positions.

The user device 1414 is further configured to send commands for starting recording/streaming of the object 1412 by the cameras 1402, 1404, 1406, 1408 and 1410 and further configured to receive the recorded content, such as audios/videos and store thereafter in a database (not shown) communicably coupled thereto or with a server 1014 (of FIG. 10). Furthermore, the user device 1414 is configured to display, via the user interface, the recorded video to the user.

Figure 15:
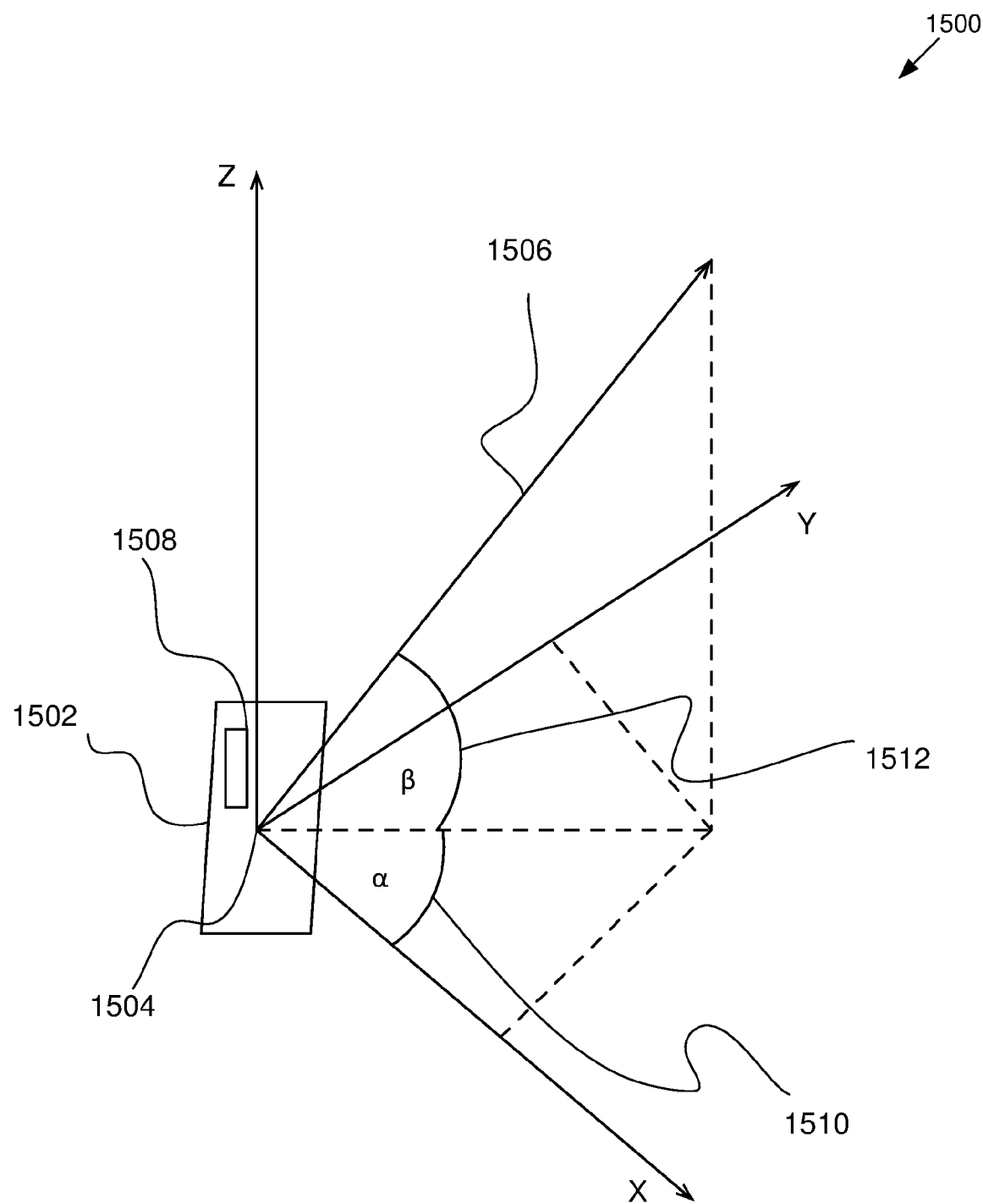
FIG. 15 is a schematic illustration of a camera and its orientation information with respect to a co-ordinate system.

Referring to FIG. 15, illustrated is a schematic illustration of a co-ordinate system 1500 (designated with X, Y Z axes) used for practicing various embodiments of the present disclosure. As shown, the coordinate system 1500 includes a camera 1502 placed at a location 1504, which is represented by coordinates: (x0, y0, z0). Further, a direction of view of the camera 1502 is indicated with an arrow 1506. The direction of view of the camera 1502 is estimated from orientation information of the camera 1502, measured by an orientation sensor 1508 installed therein. Specifically, the direction of view is represented in angle alpha ($\alpha$) 1510 from the X axis and in angle beta ($\beta$) 1512 from surface defined by the X and Y axes.

Figure 16:
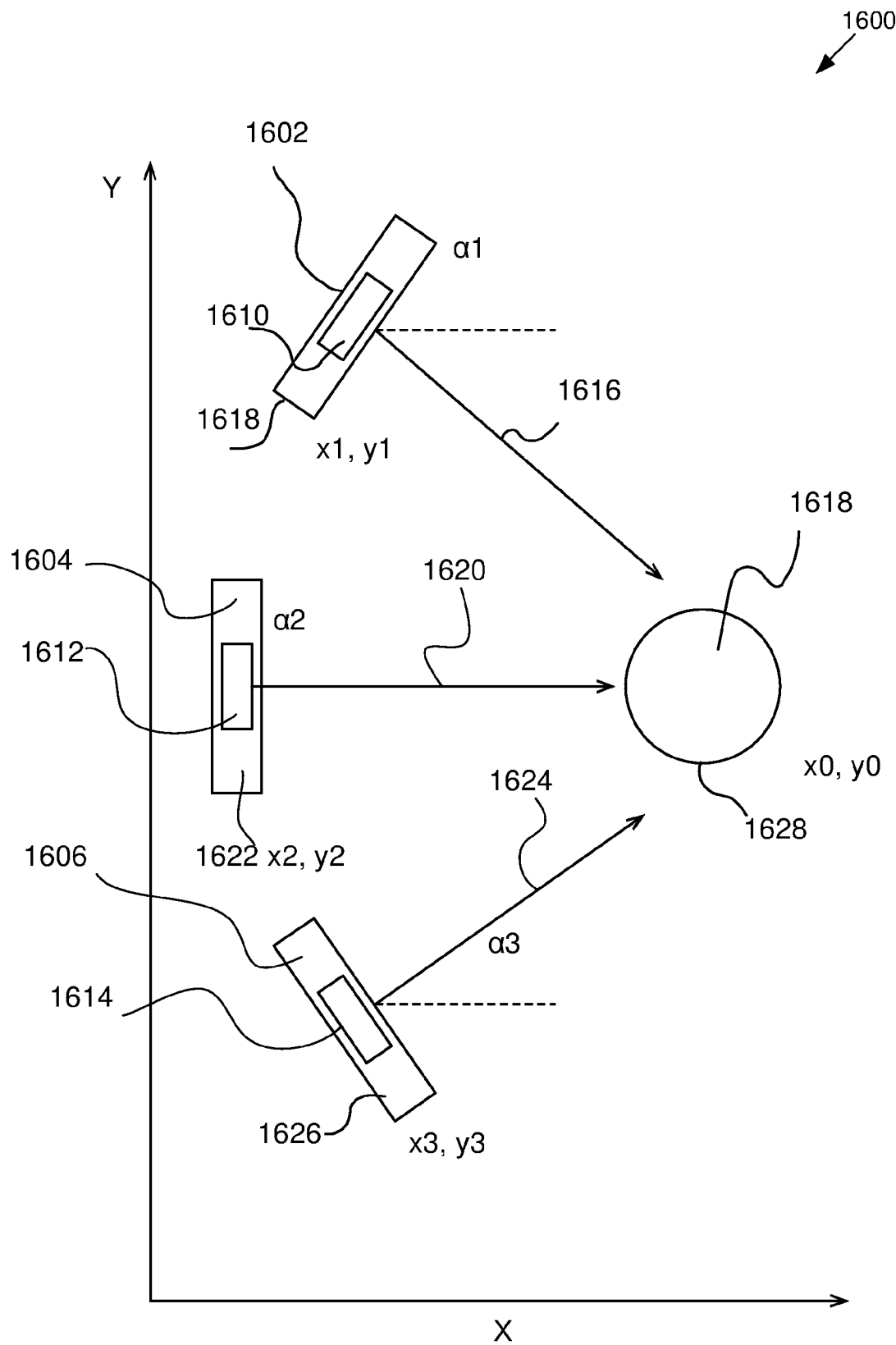
FIG. 16 is schematic illustration of a plurality of cameras and its orientation information with respect to another coordinate system.

Referring now to FIG. 16, illustrated is an example illustration depicting a plurality of cameras in a coordinate system 1600. As shown, the coordinate system 1600 includes the cameras 1602, 1604 and 1606, each having angle (beta $\beta=0$, as shown in FIG. 15) as seen from a direction of Z-axis (not shown). Also, shown is an object 1608 to be recorded by the 1602, 1604 and 1606. Specifically, FIG. 16 illustrates orientation information of the cameras 1602, 1604 and 1606, determined by orientation sensors 1610, 1612 and 1614 installed therein respectively.

The orientation information includes angles at which the cameras 1602, 1604 and 1606 are arranged with respect to X axis, which is used to determine a direction of view of each of the cameras 1602, 1604 and 1606 and their relative position thereafter. In an instance, the orientation sensor 1610 installed in the camera 1602 determines that the camera 1602 is in angle $\alpha 1$ with respect to X-axis. This data may be used by the user device 1414 (shown in FIG. 14) or by the server 1014 (shown in FIG. 10) to determine a direction of view of the camera 1602, which is indicated with an arrow 1616, and a position of the camera 1602, indicated at a location 1618 represented by coordinates (x1, y1).

Further, the orientation sensor 1612 installed in the camera 1604 determines that the camera 1604 is in angle $\alpha 2$ with respect to X-axis. This data may be used by the user device 1414 (of FIG. 14) or by the server 1014 (of FIG. 10) to determine a direction of view of the camera 1604, which is indicated with an arrow 1620 and a position of the camera 1604, indicated at a location 1622 represented by coordinates (x2, y2). The orientation sensor 1614 installed in the camera 1606 determines that the camera 1606 is in angle $\alpha 3$ with respect to X-axis. Similarly, this data may be used by the user device 1414 (of FIG. 14) or by the server 1014 (of FIG. 10) to determine a viewing direction of the camera 1606, which is indicated with an arrow 1624 and a position of the camera 1606, indicated at a location 1626 represented by coordinates (x3, y3). Further, the object 1608 is placed at a location 1628 represented by coordinates (x0, y0). Embodiment of the disclosure is not limited to two dimensional case i.e. cameras 1604, 1606, 1608 can be in a same level in respect to a XY plane (z1=z2=z3) or the cameras can be in different planes in respect to a XY plane (z1< >z2, z2< >z3 for example).

Figure 17:
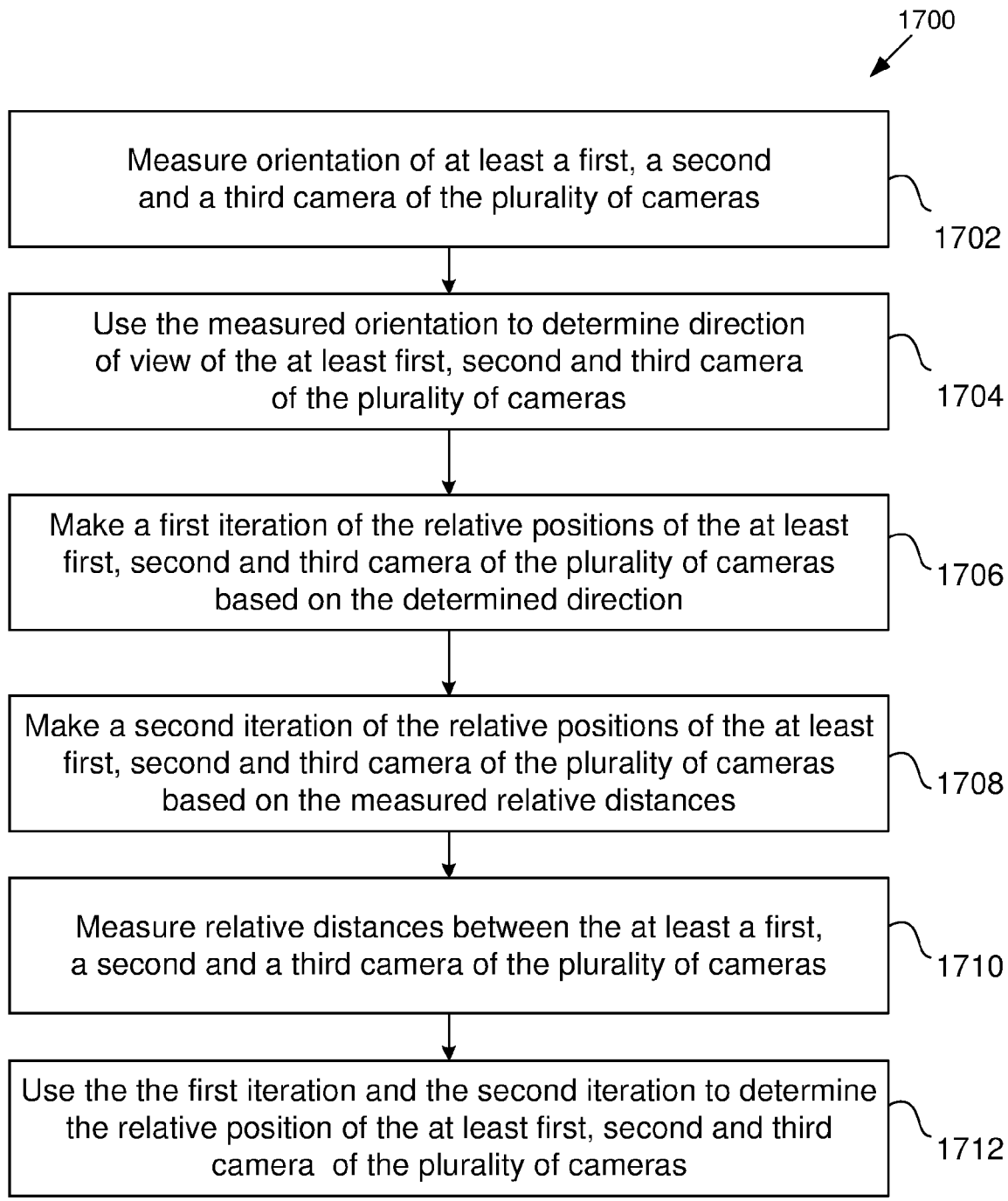
FIG. 17 depicts a flowchart of an example of a method for determining relative positions of the plurality of cameras with respect to each other within a location.

FIG. 17 depicts a flowchart 1700 of an example of a method for determining relative positions of the plurality of cameras with respect to each other within a location. Those skilled in the art would recognize that the flowchart 1700 can be used in association with the system 1000, explained in conjunction with the FIG. 10.

In the example of FIG. 17, the flowchart 1700 starts at module 1702, where orientation of at least a first, a second and a third camera of the plurality of cameras are measured. Examples of how to measure orientations are described with reference to FIGS. 10-16.

The flowchart 1700 continues to module 1704, where a direction of view of the at least first, second and third camera of the plurality of cameras is determined using the measured orientation. Examples of how to determine a direction of view at the cameras are described with reference to FIGS. 10-16.

The flowchart 1700 continues to module 1706, where a first iteration of the relative positions of the at least first, second and third camera of the plurality of cameras is made based on the determined direction. Examples of how to make a first iteration of relative positions are described with reference to FIGS. 10-16.

The flowchart 1700 continues to module 1708, where relative distances between the at least first, second and third camera of the plurality of cameras are measured. Examples of how to measure relative distances between cameras are described with reference to FIGS. 10-16.

The flowchart 1700 continues to module 1710, where a second iteration of the relative positions of the at least first, second and third camera of the plurality of cameras is made based on the measured relative distances. Examples of how to make a second iteration of relative positions are described with reference to FIGS. 10-16.

The flowchart 1700 continues to module 1712, where the relative positions of the at least first, second and third camera of the plurality of cameras with respect to each other are determined using the first iteration and the second iteration. Examples of how to determine relative positions of cameras are described with reference to FIGS. 10-16.

The modules 1702 to 1712 are only illustrative and other alternatives can also be provided where one or more modules are added, one or more modules are removed, or one or more modules are provided in a different sequence without departing from the scope of the claims herein. For example, in the flowchart 1700, the first iteration is based on assuming the orientation of the at least first, second and third camera of the plurality of cameras is towards an object. Further, in the flowchart 1700, the measured relative distances are based on calculating received signal strength indicator values between the at least first, second and third camera of the plurality of cameras. Furthermore, in the flowchart 1700, the second iteration of the relative positions is based on comparing the measured relative distances and a theoretical distance between the at least first, second and third camera of the plurality of cameras. Moreover, in the flowchart 1700, the theoretical distance is based on assuming the location to be of a defined geometric shape.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus may be specially constructed for the required purposes, or it may comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided. FIG. 9 shows an example of a screenshot of a list of simplified APIs, according to some implementations.

What is claimed is:

1. A system comprising:
a time-synchronized video capture device management engine including a processor to gather time-synchronized video content of one or more areas of interest from one or more time-synchronized video capture devices, the time-synchronized video content corresponding to fields of view of the one or more areas of interest;
a three-dimensional dome representation integration engine coupled to the time-synchronized video capture device management engine, the three-dimensional dome representation integration engine including a processor to:
identify an orientation for each of the fields of view, the orientation being associated with a viewer perspective related to the each of the fields of view;
mark the orientations with orientation markers;
integrate the time-synchronized video content and the orientation markers into a three-dimensional dome representation of the one or more areas of interest, the three-dimensional dome representation configured to arrange the time-synchronized video content in accordance with the orientation markers;
a stitched video representation management engine coupled to the three-dimensional dome representation integration engine, the stitched video representation management engine including a processor to create a stitched video representation of the one or more areas of interest using the three-dimensional dome representation, the stitched video representation configured to facilitate display of any of the time-synchronized video content at a specific time, and the stitched video representation using the orientation markers to facilitate switching between the time-synchronized video content at the specific time;
a playback device management engine coupled to the stitched video representation management engine, the playback device management engine including a processor to provide the stitched video representation to one or more playback devices for display by the one or more playback devices;
a time synchronization management engine coupled to the time-synchronized video capture device management engine, the time synchronization management engine including a processor to use a time-synchronization trigger to time-synchronize the one or more time-synchronized video capture devices before the time-synchronized video content are captured, wherein the time-synchronization trigger comprises one or more of a timing trigger, a sound-based trigger, a machine vision trigger, a motion-based trigger, and an object-based trigger and wherein using the time-synchronization trigger to time-synchronize the one or more time-synchronized video capture devices comprises configuring the one or more time-synchronized video capture devices to implement a video buffer, and to start recording the time-synchronized video content at the end of the video buffer.

2. The system of claim 1, wherein the one or more time-synchronized video capture devices include a depth sensor, and the video content comprise three-dimensional video content of the one or more areas of interest.

3. The system of claim 1, wherein the one or more areas of interest comprise a subject of the time-synchronized video content, the subject has an object associated therewith, the one or more time-synchronized video capture devices are configured to capture a reference area around the object, and the object is associated with a fob or a beacon.

4. The system of claim 1, wherein the one or more time-synchronized video capture devices are configured to stream the time-synchronized video content.

5. The system of claim 1, wherein the one or more time-synchronized video capture devices comprise a master time-synchronized video capture device and a slave time-synchronized video capture device, the slave time-synchronized video capture device is configured to provide slave time-synchronized time clips to the master time-synchronized video capture device, and the master time-synchronized video capture device is configured to batch upload master time-synchronized video content over a computer-readable medium.

6. The system of claim 1, wherein the one or more playback devices comprise one or more mobile phones or one or more tablet computing devices configured to display the stitched video representation in an application.

7. The system of claim 1, wherein each of the one or more playback devices comprises a graphical interface configured to display the stitched video representation thereon and wherein the stitched video representation comprises a perspective user interface (UI) element, the perspective UI element corresponding to at least one of the orientations.

8. The system of claim 1, wherein the stitched video representation comprises a perspective user interface (UI) element, the perspective UI element corresponding to at least one of the orientations and wherein the perspective UI element comprises a floating virtual object.

9. The system of claim 1, wherein the stitched video representation management engine is configured to accommodate a plurality of frame rates.

10. A method comprising:
gathering time-synchronized video content of one or more areas of interest from one or more time-synchronized video capture devices, the time-synchronized video content corresponding to fields of view of the one or more areas of interest;
identifying an orientation for each of the fields of view, the orientation being associated with a viewer perspective related to the each of the fields of view;
marking the orientations with orientation markers;
integrating the time-synchronized video content and the orientation markers into a three-dimensional dome representation of the one or more areas of interest, the three-dimensional dome representation configured to arrange the time-synchronized video content in accordance with the orientation markers;
creating a stitched video representation of the one or more areas of interest using the three-dimensional dome representation, the stitched video representation configured to facilitate display of any of the time-synchronized video content at a specific time, and the stitched video representation using the orientation markers to facilitate switching between the time-synchronized video content at the specific time;
providing the stitched video representation to one or more playback devices for display by the one or more playback devices;
using a time-synchronization trigger to time-synchronize the one or more time-synchronized video capture devices before the time-synchronized video content are captured, wherein the time-synchronization trigger comprises one or more of a timing trigger, a sound-based trigger, a machine vision trigger, a motion-based trigger, and an object-based trigger and wherein using the time-synchronization trigger to time-synchronize the one or more time-synchronized video capture devices comprises configuring the one or more time-synchronized video capture devices to implement a video buffer, and to start recording the time-synchronized video content at the end of the video buffer.

11. The method of claim 10, wherein the one or more time-synchronized video capture devices include a depth sensor, and the video content comprise three-dimensional video content of the one or more areas of interest.

12. The method of claim 10, wherein the one or more areas of interest comprise a subject of the time-synchronized video content, the subject has an object associated therewith, the one or more time-synchronized video capture devices are configured to capture a reference area around the object, and the object is associated with a fob or beacon.

13. The method of claim 10, wherein the one or more of the time-synchronized video capture devices are configured to stream the time-synchronized video content.

14. The method of claim 10, wherein the one or more time-synchronized video capture devices are configured to batch upload the time-synchronized video content, wherein the one or more time-synchronized video capture devices comprise a master time-synchronized video capture device and a slave time-synchronized video capture device, the slave time-synchronized video capture device is configured to provide slave time-synchronized time clips to the master time-synchronized video capture device, and the master time-synchronized video capture device is configured to batch upload master time-synchronized video content over a computer-readable medium.

15. The method of claim 10, wherein the one or more playback devices comprise one or more mobile phones or one or more tablet computing devices configured to display the stitched video representation in an application.

16. The method of claim 10, further comprising providing instructions to time-synchronize the one or more time-synchronized video capture devices before gathering the time-synchronized video content.

17. The method of claim 10, further comprising displaying the stitched video representation on the one or more playback devices, wherein the stitched video representation comprises a perspective user interface (UI) element, the perspective UI element corresponding to at least one of the orientations and wherein the perspective UI element comprises a floating virtual object.

18. The method of claim 10, wherein creating the stitched video representation comprises accommodating a plurality of frame rates.

19. A system comprising:
a means for gathering time-synchronized video content of one or more areas of interest from time-synchronized video capture devices, the time-synchronized video content corresponding to fields of view of the one or more areas of interest;

a means for identifying an orientation for each of the fields of view, the orientation being associated with a viewer perspective related to the each of the fields of view;

a means for marking the orientations with orientation markers;

a means for integrating the time-synchronized video content and the orientation markers into a three-dimensional dome representation of the one or more areas of interest, the three-dimensional dome representation configured to arrange the time-synchronized video content in accordance with the orientation markers;

a means for creating a stitched video representation of the one or more areas of interest using the three-dimensional dome representation, the stitched video representation configured to facilitate display of any of the time-synchronized video content at a specific time, and the stitched video representation using the orientation markers to facilitate switching between the time-synchronized video content at the specific time;

a means for providing the stitched video representation to one or more playback devices for display by the one or more playback devices;

a means for using a time-synchronization trigger to time-synchronize the one or more time-synchronized video capture devices before the time-synchronized video content are captured, wherein the time-synchronization trigger comprises one or more of a timing trigger, a sound-based trigger, a machine vision trigger, a motion-based trigger, and an object-based trigger and wherein using the time-synchronization trigger to time-synchronize the one or more time-synchronized video capture devices comprises configuring the one or more time-synchronized video capture devices to implement a video buffer, and to start recording the time-synchronized video content at the end of the video buffer.

* * * * *